(12) United States Patent
Xin et al.

(10) Patent No.: US 8,588,426 B2
(45) Date of Patent: Nov. 19, 2013

(54) METHODS AND APPARATUS TO SECURE COMMUNICATIONS IN A MOBILE NETWORK

(75) Inventors: Yan Xin, Kanata (CA); Shouxing Qu, Groucester (CA)

(73) Assignee: BlackBerry Limited, Waterloo, Ontario (CA)

(*) Notice: Subject to any disclaimer, the term of this patent is extended or adjusted under 35 U.S.C. 154(b) by 186 days.

(21) Appl. No.: 13/031,561

(22) Filed: Feb. 21, 2011

(65) Prior Publication Data
US 2012/0213373 A1 Aug. 23, 2012

(51) Int. Cl.
*H04L 9/08* (2006.01)
*H04L 9/00* (2006.01)
*H04K 1/00* (2006.01)
*H04K 1/02* (2006.01)

(52) U.S. Cl.
USPC .......... 380/287; 380/252; 380/268; 380/272; 380/278

(58) Field of Classification Search
USPC .......... 380/252, 268, 272, 278, 287; 714/784, 714/780, 805, 758, 807, 762
See application file for complete search history.

(56) References Cited

U.S. PATENT DOCUMENTS

| | | | | |
|---|---|---|---|---|
| 3,775,746 A * | 11/1973 | Boudreau et al. | 714/761 |
| 5,081,679 A * | 1/1992 | Dent | 380/272 |
| 7,120,851 B2 * | 10/2006 | Ting et al. | 714/755 |
| 7,487,356 B2 * | 2/2009 | Kunisa | 713/176 |
| 7,593,368 B2 * | 9/2009 | Zeng et al. | 370/332 |
| 7,620,013 B2 * | 11/2009 | Zeng et al. | 370/329 |
| 7,693,531 B2 * | 4/2010 | Heiman | 455/515 |
| 8,046,662 B2 * | 10/2011 | Heiman et al. | 714/758 |
| 8,107,542 B1 * | 1/2012 | Lou et al. | 375/259 |
| 8,155,683 B2 * | 4/2012 | Buckley et al. | 455/515 |
| 8,165,618 B1 * | 4/2012 | Hole et al. | 455/515 |
| 2002/0181708 A1* | 12/2002 | Seo et al. | 380/252 |
| 2003/0103480 A1* | 6/2003 | You et al. | 370/335 |
| 2008/0170699 A1* | 7/2008 | Fratti et al. | 380/278 |
| 2008/0282131 A1* | 11/2008 | You et al. | 714/758 |
| 2008/0282137 A1* | 11/2008 | You et al. | 714/807 |
| 2010/0251070 A1* | 9/2010 | Desai et al. | 714/762 |
| 2011/0105168 A1* | 5/2011 | McDonald et al. | 455/509 |
| 2011/0267939 A1* | 11/2011 | Streed et al. | 370/216 |
| 2012/0134353 A1* | 5/2012 | Streed et al. | 370/350 |
| 2012/0220287 A1* | 8/2012 | Hole et al. | 455/422.1 |

OTHER PUBLICATIONS

3rd Generation Partnership Project: Technical Specification Group GSM/EDGE Radio Access Network; Channel Coding (Release 8). Sep. 2009. p. 1-321.*

(Continued)

*Primary Examiner* — Edan Orgad
*Assistant Examiner* — Kari Schmidt
(74) *Attorney, Agent, or Firm* — Hanley, Flight & Zimmerman, LLC

(57) ABSTRACT

Methods and apparatus to secure communications in a mobile network are disclosed. An example method disclosed herein comprises randomizing a first set of bits associated with information to be communicated over a slow associated control channel by applying a scrambling factor to generate a set of scrambled bits equal in length to the first set of bits. Another example method disclosed herein comprises concatenating a set of error detection bits with a set of information bits associated with information to be transmitted over a slow associated control channel to generate a set of coded bits, and shuffling the set of coded bits to generate a set of shuffled bits.

22 Claims, 15 Drawing Sheets

(56) References Cited

OTHER PUBLICATIONS

3GPP, "Technical Specification Group Services and System Aspects; Security Related Network Functions (Release 7)," TS 43.020, V7.3.1, Jul. 2008, (109 pages).

3GPP, "Technical Specification Group GSM/EDGE Radio Access Network; Mobile Radio Interface Layer 3 Specification; Radio Resource Control (RRC) Protocol (Release 7)," TS 44.018, V7.19.1, Apr. 2010, (401 pages).

3GPP, "Technical Specification Group GSM/EDGE Radio Access Network; Physical Layer on the Radio Path; General Description (Release 7)," TS 45.001, V7.9.0, Sep. 2009, (39 pages).

3GPP, "Technical Specification Group GSM/EDGE Radio Access Network; Radio Access Network; Channel Coding (Release 7)," TS 45.003, V7.10.0, Sep. 2009, (321 pages).

Biryukov et al., "Real Time Cryptanalysis of A5/1 on a PC" (18 pages).

Ekdahl et al., "Another Attack on A5/1," 2002 (7 pages).

Fair et al., "Guided Scrambling: A New Line Coding Technique for High Bit Rate Fiber Optic Transmission Systems," IEEE Transactions on Communications, vol. 39, No. 2, Feb. 9, 1991 (9 pages).

Vodafone, "Additional A5/1-GEA1 Attack Countermeasures," GP-101243, 3GPP TSG GERAN #48, Nov. 2010 (7 pages).

Nokia Corporation, "On Removing SACCH Ciphering," GP-101787, GPP TSG GERAN #48, Nov. 2010 (4 pages).

Nokia Corporation, "Change Request 44.018 CR 0885," GP-101924, 3GPP TSG GERAN #48, Nov. 2010 (5 pages).

Nokia Corporation, "Change Request 44.018 CR 0886," GP-101925, 3GPP TSG GERAN #48, Nov. 2010 (3 pages).

Nokia Corporation, "Answer to LS on SACCH Security," GP-101966, 3GPP SA3#61, Nov. 2010 (1 page).

* cited by examiner

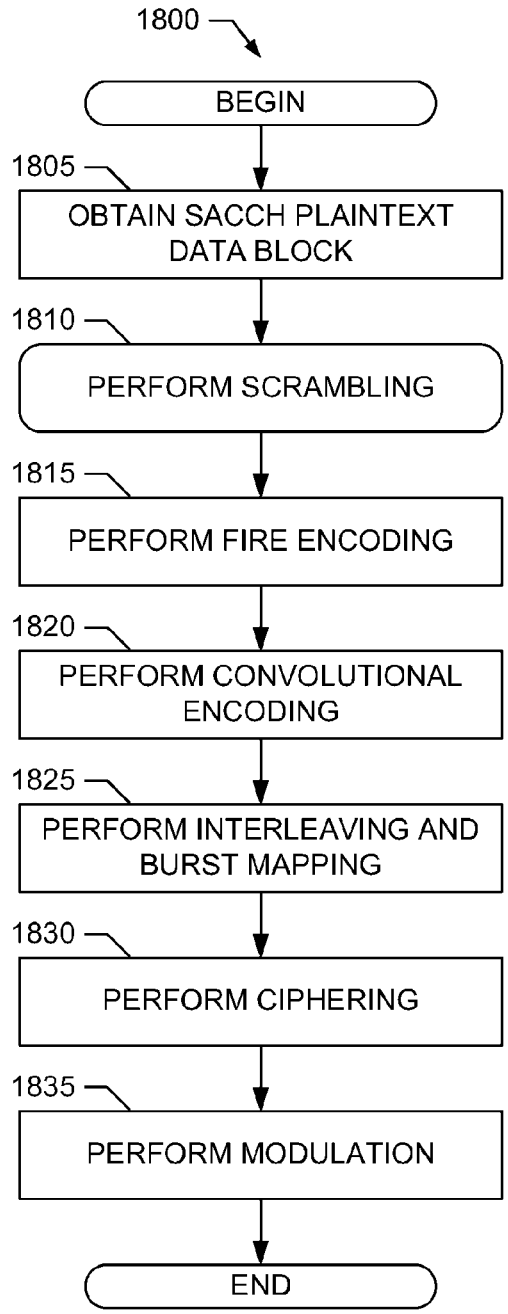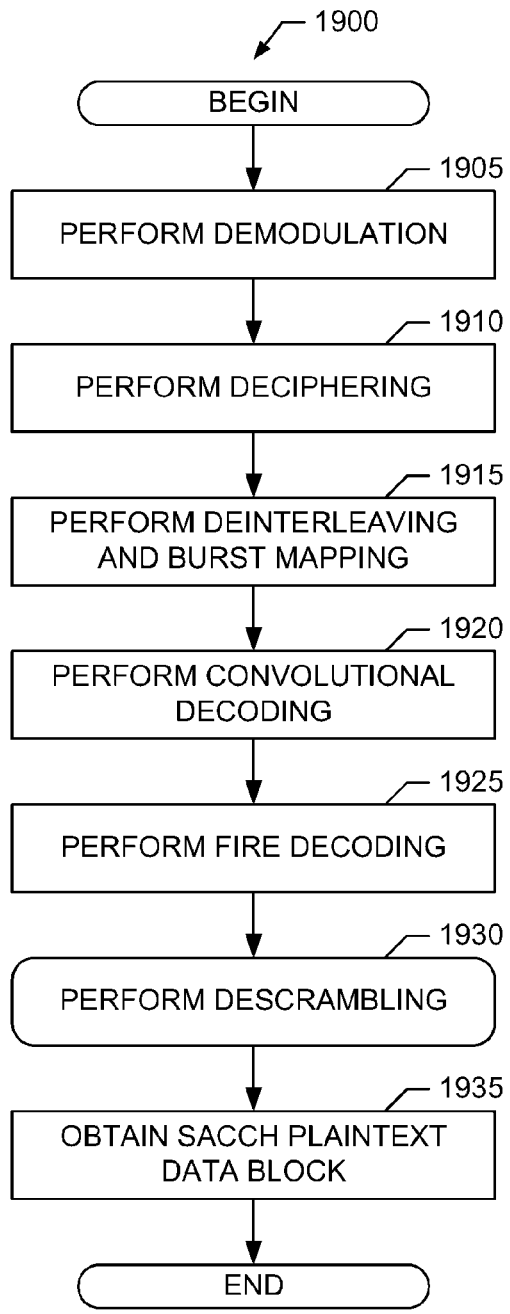
FIG. 18
FIG. 19

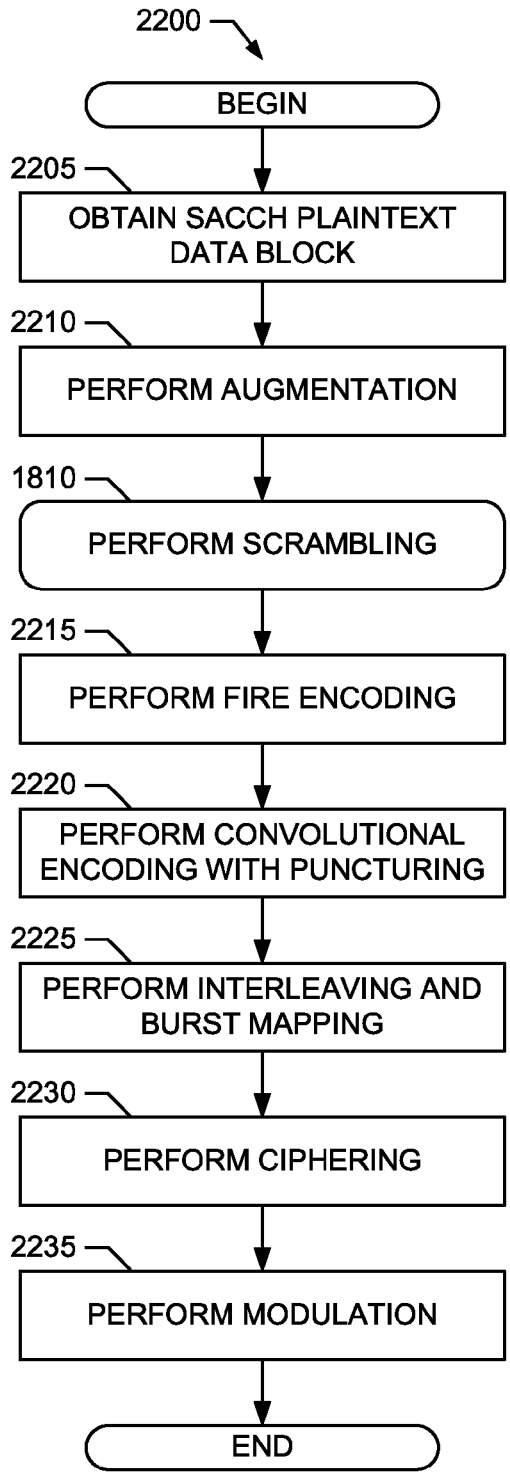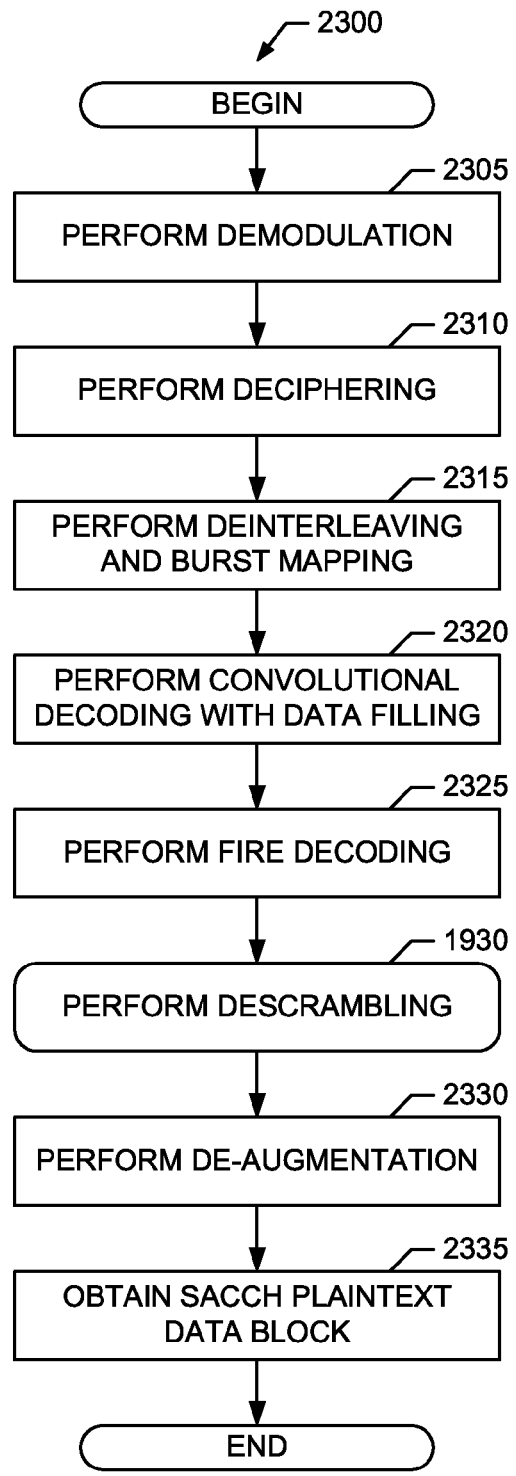
FIG. 22
FIG. 23

METHODS AND APPARATUS TO SECURE COMMUNICATIONS IN A MOBILE NETWORK

FIELD OF THE DISCLOSURE

This disclosure relates generally to mobile networks and, more particularly, to methods and apparatus to secure communications in a mobile network.

BACKGROUND

In global system for mobile communications (GSM) networks, A5 ciphering is one technique used to protect data (e.g., such as user data and signaling information) at the physical layer. For example, the A5 ciphering algorithm is used to secure communications on the traffic channel (TCH) and on its associated control channels, such as the fast associated control channel (FACCH) and the slow associated control channel (SACCH). However, some information that is transmitted securely over the SACCH using A5 ciphering is also broadcast as plaintext (or, in other words, unciphered) on the broadcast channel (BCCH). An attacker could compare the plaintext information broadcast on the BCCH with ciphered information captured by monitoring a SACCH to recover the ciphering key employed by the A5 ciphering algorithm, thereby allowing the attacker to gain access to other information that has been A5 ciphered using this ciphering key.

BRIEF DESCRIPTION OF THE DRAWINGS

FIG. 18 is a flowchart representative of an example process that may be performed to implement the example SACCH encoding chain of FIG. 9.

FIG. 19 is a flowchart representative of an example process that may be performed to implement the example SACCH decoding chain of FIG. 10.

FIG. 22 is a flowchart representative of an example process that may be performed to implement the example SACCH encoding chain of FIG. 13.

FIG. 23 is a flowchart representative of an example process that may be performed to implement the example SACCH decoding chain of FIG. 14.

Figure 9:
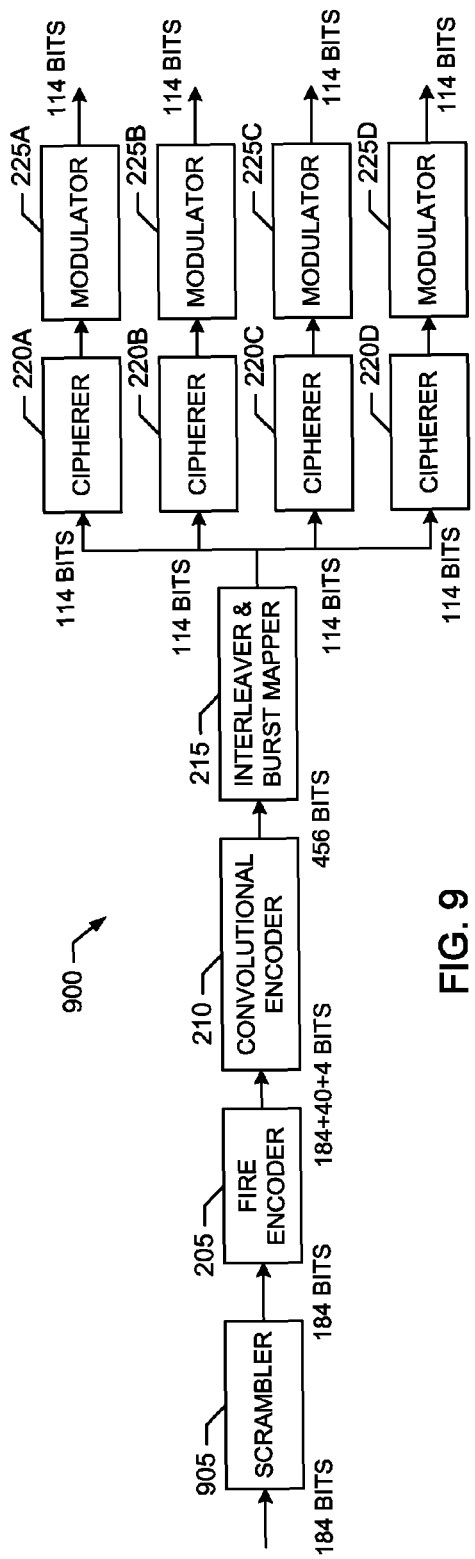
FIG. 9 is a block diagram of an example SACCH encoding chain using scrambling in accordance with the example methods and apparatus disclosed herein to secure communications in the example mobile network of FIG. 1.
Figure 10:
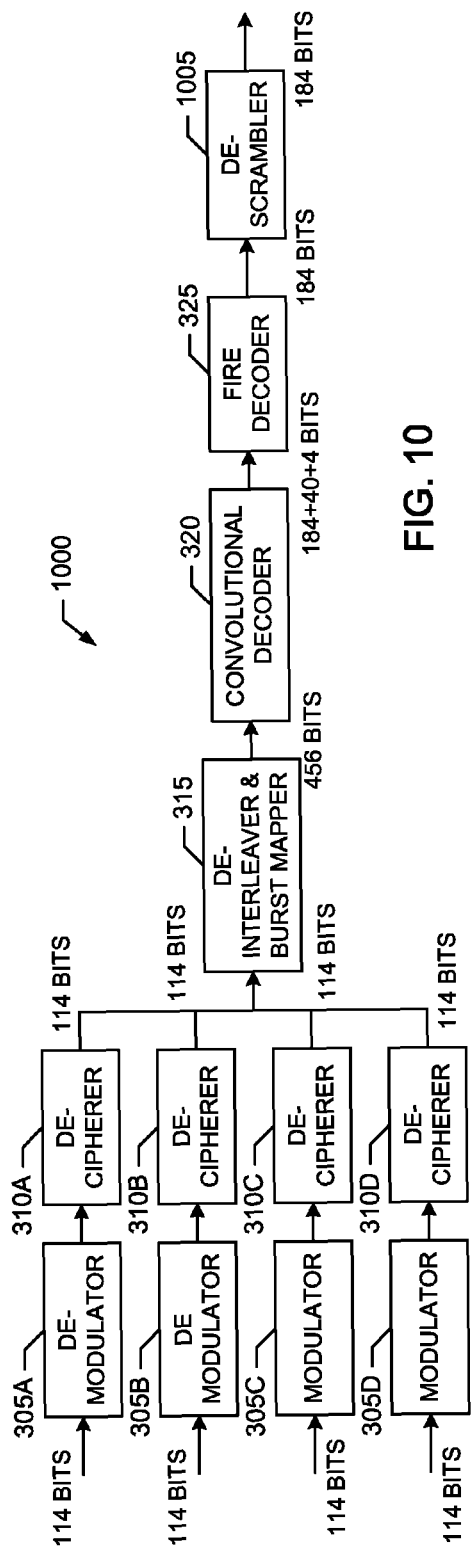
FIG. 10 is a block diagram of an example SACCH decoding chain using descrambling in accordance with the example methods and apparatus disclosed herein to secure communications in the example mobile network of FIG. 1.
Figure 13:
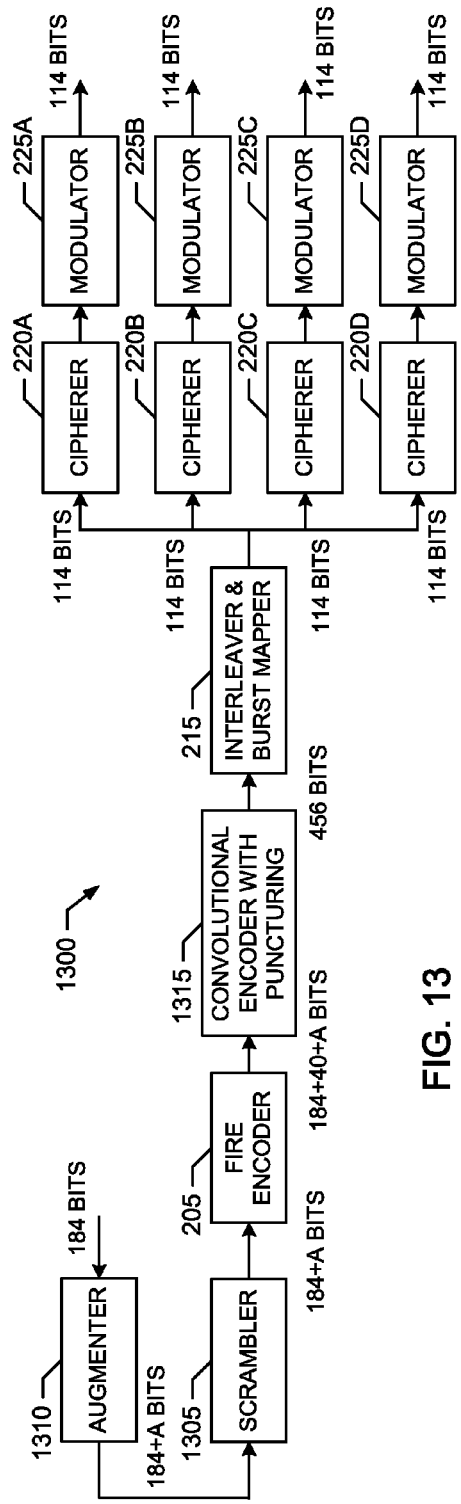
FIG. 13 is a block diagram of an example SACCH encoding chain using augmentation and scrambling in accordance with the example methods and apparatus disclosed herein to secure communications in the example mobile network of FIG. 1.
Figure 14:
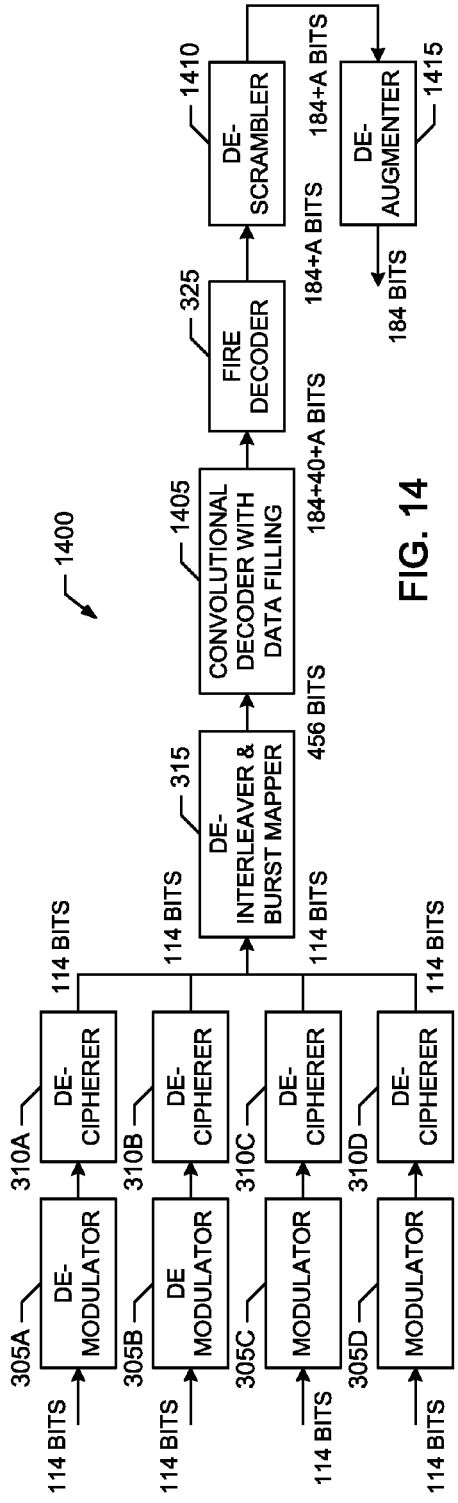
FIG. 14 is a block diagram of an example SACCH decoding chain using de-augmentation and descrambling in accordance with the example methods and apparatus disclosed herein to secure communications in the example mobile network of FIG. 1.

1, one or more of the example encoding chains of FIGS. 9, 13 and/or 15A-B, and/or one or more of the example decoding chains of FIGS. 10, 14 and/or 16.

DETAILED DESCRIPTION

Methods and apparatus to secure communications in a mobile network are disclosed herein. In general, example methods and apparatus disclosed herein secure communications on a SACCH that is transmitted in a GSM mobile network. In some examples, SACCH communications are secured to prevent an attacker from being able to recover a ciphering key by comparing ciphered information on the SACCH with plaintext information sent on a BCCH in the GSM mobile network. An example of such a method to secure communications in a mobile network includes obtaining an block of information bits associated with information to be communicated over a SACCH of the GSM mobile network. The example method also includes randomizing the information block based on a subset of information bits included in the information block before ciphering is performed to secure communication over the SACCH. Examples techniques to randomize the information block include scrambling the information block, augmenting and then scrambling the information block, shuffling a coded version of the information block, and/or one or more combinations thereof.

Example methods and apparatus disclosed herein can provide substantial benefits over prior proposals for securing communication over a SACCH in a GSM mobile network. For example, unlike examples disclosed herein, some prior proposals for securing communication over the SACCH fail to sufficiently randomize the SACCH information payload such that a portion of the ciphered information on the SACCH is comparable with a portion of the plaintext information on the BCCH and is thereby exploitable by an attacker to recover the ciphering key. Other prior proposals add complexity in the form of enabling and disabling ciphering on the SACCH depending on the information payload. For example, in one such prior proposal, ciphering on the SACCH is disabled if information that is to be transmitted on the SACCH can be compared with plaintext information on the BCCH, but is enabled if other information (such as short message service data) that is not comparable to the plaintext information on the BCCH is to be transmitted on the SACCH Implementing such a prior proposal adds complexity, such as additional signaling and decision functionally to be implemented by the network and the mobile stations. In contrast, example methods and apparatus disclosed herein can be implemented without such additional complexity.

Figure 1:
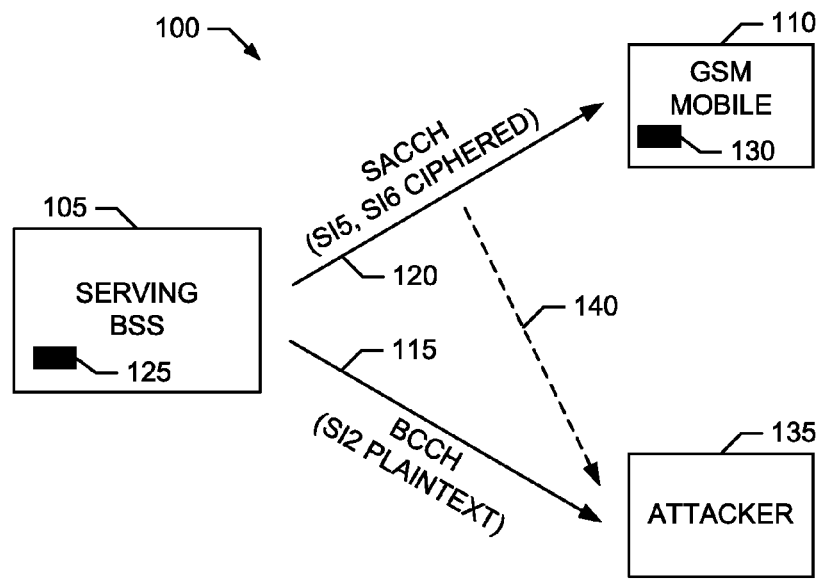
FIG. 1 is block diagram of an example mobile network in which communications on a SACCH can be secured in accordance with the example methods and apparatus disclosed herein.

Turning to the figures, a block diagram of an example mobile network 100 in which communications can be secured in accordance with the example methods and apparatus disclosed herein is illustrated in FIG. 1. The mobile network 100 of the illustrated example is a GSM mobile network and includes an example base station subsystem (BSS) 105 that may be implemented by, for example, one or more of a base station transceiver (BTS), a base station controller (BSC), a network cell, etc., or multiple instances or combinations thereof. The mobile communication system 100 also includes an example mobile station 110. The mobile station 110 may be implemented by any type of mobile station or user endpoint equipment, such as a smartphone, a mobile telephone device that is portable, a mobile telephone device implementing a stationary telephone, a personal digital assistant (PDA), etc. Furthermore, although only one BSS 105 and one mobile station 110 are illustrated in FIG. 1, the mobile network 100 can support any number of network elements and mobile stations.

As shown in FIG. 1, the BSS 105 broadcasts an example BCCH 115 that can be received by mobile stations (such as the mobile station 110) located in the serving cell corresponding to the BSS 105. The BCCH 115 broadcasts signaling information to enable mobile stations (such as the mobile station 110) to establish and maintain connectivity with the BSS 105 and, more generally, the mobile network 100. For example, in GSM, the BCCH 115 carries system information (SI) type 2 (SI2) blocks, which contain neighbor cell information in a Neighbor Cell Description Information Element (IE). This neighbor cell information includes a list of cells that are neighbors of the serving cell corresponding to the BSS 105. Mobile stations (such as the mobile station 110) can use the neighbor cell information broadcast via the SI2 blocks to perform cell reselection, cell handoffs, etc. Because at least some mobile stations operating in the serving cell corresponding to the BSS 105 may not have established communication sessions with the BSS 105, the SI2 blocks, as well as other information on the BCCH 115, are broadcast without ciphering or, in other words, in plaintext form. In GSM, other SI blocks that are broadcast on the BCCH 115 as plaintext include SI2bis blocks and SI2ter blocks.

In the illustrated example of FIG. 1, the BSS 105 has also established a TCH with the mobile station 110 (e.g., to carry user data for a voice call) and, thus, has also established an example SACCH 120 that is associated with the TCH. The SACCH 120 carries physical layer (e.g., layer-1) and higher-layer (e.g., layer-2) signaling information to support communication between the mobile station 110 and the BSS 105 and, more generally, the mobile network 100. For example, in GSM, SI type 5 (SI5) blocks are transmitted on the SACCH 120. The SI5 blocks transmitted on the SACCH 120 contain neighbor cell information in a Neighbor Cell Description IE, which may be similar or identical to the neighbor cell information contained in the SI2 blocks broadcast on the BCCH 115. This enables the mobile station 110 to obtain neighbor cell information from the SACCH 120 without needing to separately monitor the BCCH 115. In GSM, the SACCH 120 may also carry SI5bis and SI5ter blocks, which include information similar or identical to the information contained in the respective SI2bis blocks and SI2ter blocks broadcast on the BCCH 115.

As noted above, A5 ciphering is used to secure communications on the SACCH 120, as well as the voice traffic carried by the TCH associated with the SACCH 120. There are several versions of A5 ciphering, such as A5/1, A5/3, A5/4, etc. In GSM, it is mandatory for the BSS 105 and the mobile station 110 to support A5/1 ciphering and, from Release 6 onwards, A5/3 ciphering. However, A5/1 ciphering is vulnerable to plaintext attacks, through which an attacker can discover the ciphering key used to cipher information using the A5/1 algorithm. The attacker can then use the discovered ciphering key to decipher any information ciphered using this key, which poses a potential security risk in GSM networks. Accordingly, the BSS 105 includes an example SACCH encoding chain 125 and the mobile station 110 includes an example SACCH decoding chain 130 to secure SACCH communications in a manner to prevent an attacker from discovering a ciphering key used by the A5/1 algorithm to cipher information carried on the SACCH 120.

As an illustrative example, the mobile network 100 is shown to include an example attacker 135 that performs a plaintext attack to attempt to discover the ciphering key used by A5/1 ciphering to cipher information on the SACCH 120.

For example, the attacker 135 monitors the SACCH 120 established with the mobile station 110 to obtain the ciphered SI5 blocks carried by the SACCH 120. Such monitoring is represented in FIG. 1 by a dashed line 140. The attacker 135 knows that similar or identical information is included in the SI2 block carried on the BCCH 115, which is broadcast as plaintext. In prior GSM networks (e.g., not employing the SACCH encoding chain 125 and the SACCH decoding chain 130), the attacker 135 could monitor the SACCH 120 in accordance with the GSM specifications to obtain the ciphered SI5 information blocks, which could be compared with the plaintext SI2 information blocks received from the BCCH 115 to discover the A5/1 ciphering key used to cipher information on the SACCH 120. This same ciphering key is used to cipher other information, such as the voice traffic carried on the TCH associated with the SACCH 120. As such, in prior GSM networks, the attacker 135 could use the discovered ciphering key to decipher the TCH voice traffic, as well as other information, thereby undermining the security of the GSM network. As described in greater detail below, the SACCH encoding chain 125 and the SACCH decoding chain 130 employed in the mobile network 100 implement information randomization to prevent the attacker 130 from launching a successful plaintext attack on the ciphered information carried on the SACCH 120.

Figure 2:
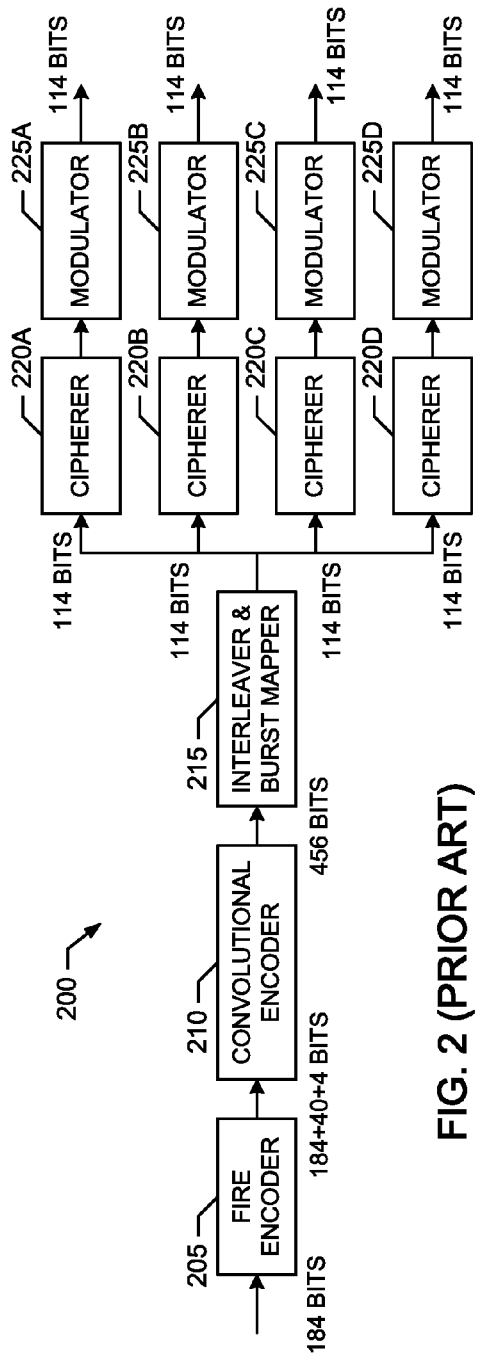
FIG. 2 is a block diagram of a prior SACCH encoding chain that can be used to send information on a SACCH that is not secured in accordance with the example methods and apparatus disclosed herein.

A prior SACCH encoding chain 200 that may be vulnerable to the attacker 135 is illustrated in FIG. 2. The SACCH encoding chain 200 could be used in a prior BSS to encode and transmit a SACCH to a prior mobile station. The SACCH encoding chain 200 includes a fire encoder 205 to fire code an information block containing information bits (e.g., 184 bits) to be sent via a SACCH. The output of the fire encoder 205 is the information payload (e.g., 184 bits), a group of error detection bits (e.g., 40 bits) and a group of padding bits (e.g., 4 bits). The SACCH encoding chain 200 also includes a convolutional encoder 210 to convolutionally encode the output of the fire encoder 205. In FIG. 2, the convolutional encoder 210 is a rate 1/2 encoder, such that the coded output block of the convolutional encoder 210 is twice the size (e.g., 456 bits) of the input data block. The SACCH encoding chain 200 further includes an interleaver and burst mapper 215 to interleave the output of the convolutional encoder 210 and map the coded data block over four bursts to be transmitted on the SACCH (e.g., with each burst containing 114 bits).

To cipher each burst of information to be transmitted on the SACCH, the SACCH encoding chain 200 includes cipherers 220A-D to implement, for example, the A5/1 ciphering algorithm. As such, information before being input to the cipherers 220A-D is referred to herein as plaintext SACCH information, and information after being output from the cipherers 220A-D is referred to herein as ciphered SACCH information. In the SACCH encoding chain 200, the ciphered SACCH bursts output by the cipherers 220A-D (e.g., with each ciphered burst containing 114 bits) are GMSK modulated (where GMSK refers to Gaussian minimum shift keying) by modulators 225A-D for transmission on the SACCH. Although four cipherers 220A-D and four modulators 225A-D are illustrated in FIG. 2, the SACCH encoding chain 200 could be implemented using fewer than four cipherers 220A-D and four modulators 225A-D. For example, the SACCH encoding chain 200 could include one of the cipherers 220A-D and one of the modulators 225A-D configured to sequentially cipher and modulate, respectively, each of the four SACCH bursts to be output.

Figure 3:
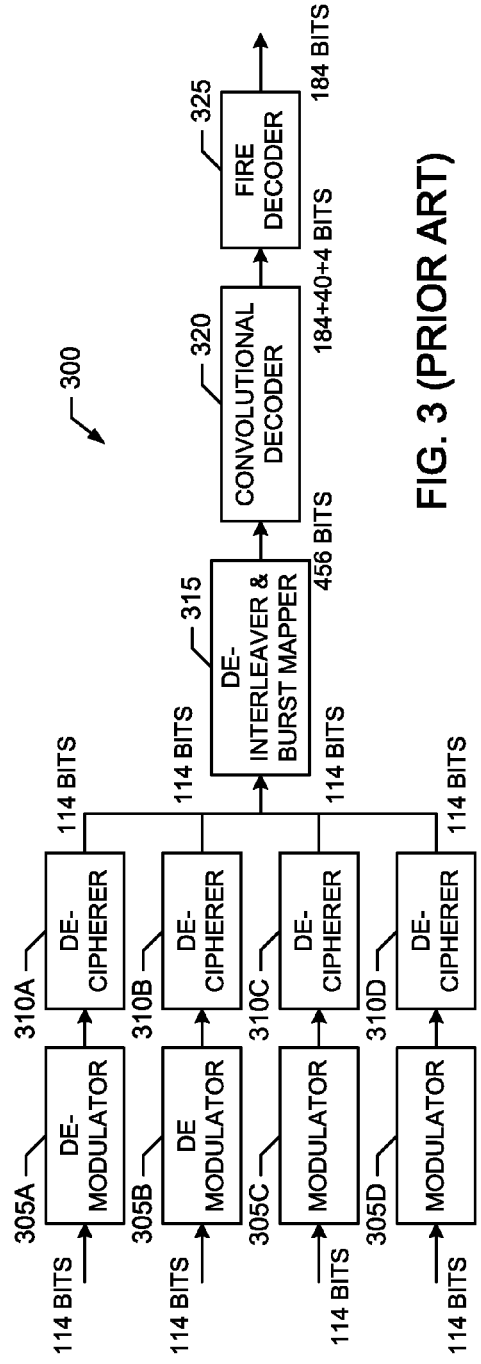
FIG. 3 is a block diagram of a prior SACCH decoding chain that can be used to receive information on a SACCH that is not secured in accordance with the example methods and apparatus disclosed herein.

A prior SACCH decoding chain 300 that may be vulnerable to the attacker 135 is illustrated in FIG. 2. The SACCH decoding chain 300 could be used in a prior mobile station to receive and decode a SACCH from a prior BSS. The SACCH decoding chain 300 implements the reverse processing of the SACCH encoding chain 200. As such, the SACCH decoding chain 300 includes demodulators 305A-D to demodulate each group of four bursts received on the SACCH. To decipher each group of four bursts, the SACCH decoding chain 300 includes decipherers 310A-D. As such, information before being input to the decipherers 310A-D is ciphered SACCH information, and information after being output from the decipherers 310A-D is plaintext SACCH information. Although four demodulators 305A-D and four decipherers 310A-D are illustrated in FIG. 3, the SACCH decoding chain 300 could be implemented using fewer than four demodulators 305A-D and four decipherers 310A-D. For example, the SACCH decoding chain 300 could include one of the demodulators 305A-D and one of the decipherers 310A-D configured to sequentially demodulate and decipher, respectively, each of the four bursts received in a group on the SACCH.

The SACCH decoding chain 300 includes a de-interleaver and burst mapper 215 to de-interleave and map the four received bursts to a coded SACCH data block for decoding by a convolutional decoder 320. The convolution decoder 320 performs decoding to produce a data block for decoding by a fire decoder 325. The fire decoder 325 performs fire decoding to obtain the information block containing the SACCH information bits conveyed via the SACCH.

Figure 4:
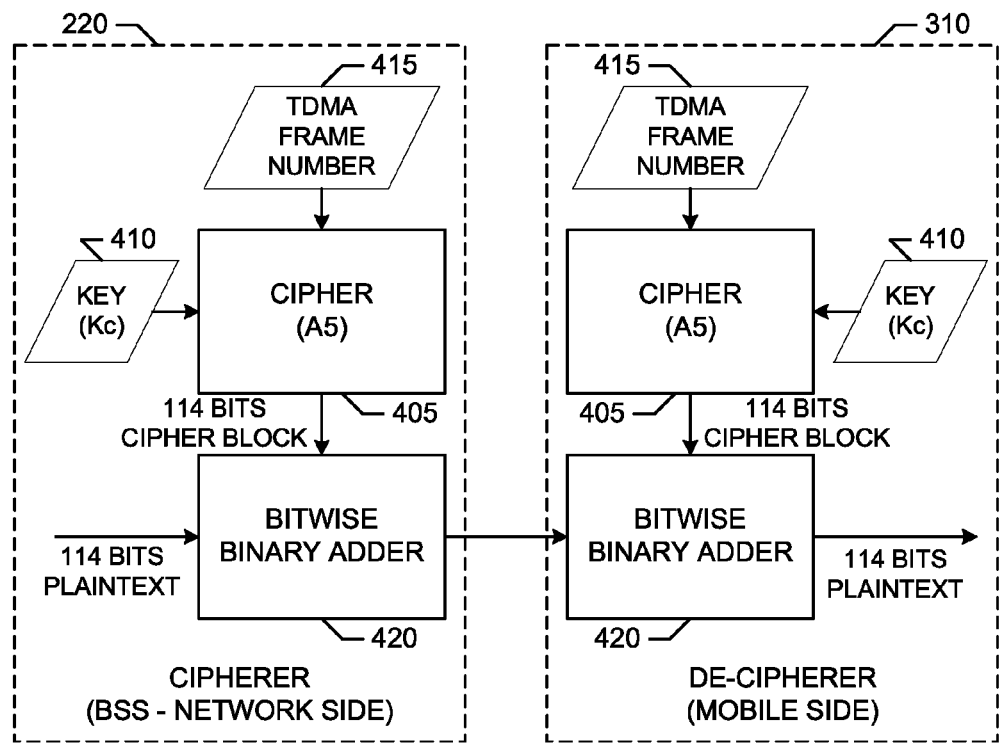
FIG. 4 is a block diagram of an example cipherer and an example decipherer that can be used to implement A5 ciphering and deciphering in the example SACCH encoding and decoding chains of FIGS. 2, 3, 9, 10, 13, 14, 15A-B and/or 16.

FIG. 4 illustrates an example cipherer 200 that can be used to implement one or more of the cipherers 220A-D, and an example decipherer 310 that can be used to implement one or more of the decipherers 310A-D. The cipherer 200 implements A5/1 ciphering, and the decipherer 310 implements A5/1 deciphering. A5/1 is a stream cipher based on irregular clocking of three linear feedback shift registers implementing an A5/1 cipher algorithm 405. A similar A5/1 cipher algorithm 405 is included in both the cipherer 220 and the decipherer 310. As illustrated in FIG. 2, A5/1 ciphering for SACCH transmission takes place before modulation and after interleaving. Conversely, as illustrated in FIG. 3, A5/1 deciphering for SACCH reception takes place after demodulation and before de-interleaving.

In GSM, for a call using A5/1 ciphering, an A5/1 ciphering key 410 (e.g., having a size of 64 bits) is determined at call setup, and this key 410 is then used by the cipherer 220 and decipher 310 during the call, unless a new authentication procedure is triggered by the network. For each time division multiple access (TDMA) frame of the SACCH, the initial state of the shift registers implementing the A5/1 cipher algorithm 405 is a linear combination of the ciphering key 410 and the current TDMA frame number 415 (e.g., which is known in the network and can be tracked, for example, by TDMA frame counters accessible by the cipherer 220 and decipher 310). For SACCH ciphering and deciphering in GSM, the A5/1 cipher algorithm 405 generates a sequence of 114 cipher bits from three registers. At the cipherer 220, the cipher bits output from the A5/1 cipher algorithm 405 are combined with the 114-bit plaintext data burst to be transmitted on the SACCH by an example bitwise binary adder 420 that performs bitwise modulo-2 addition. The result is the ciphered data burst to be transmitted on the SACCH. Conversely, at the decipherer 310, the cipher bits output from the A5/1 cipher algorithm 405 are combined with the 114-bit ciphered data burst received on the SACCH by another instance of the example bitwise binary adder 420 that performs bit-wise modulo-2 addition. The result is a deciphered (e.g., plaintext) version of the data burst that was received on the SACCH.

Figure 5:
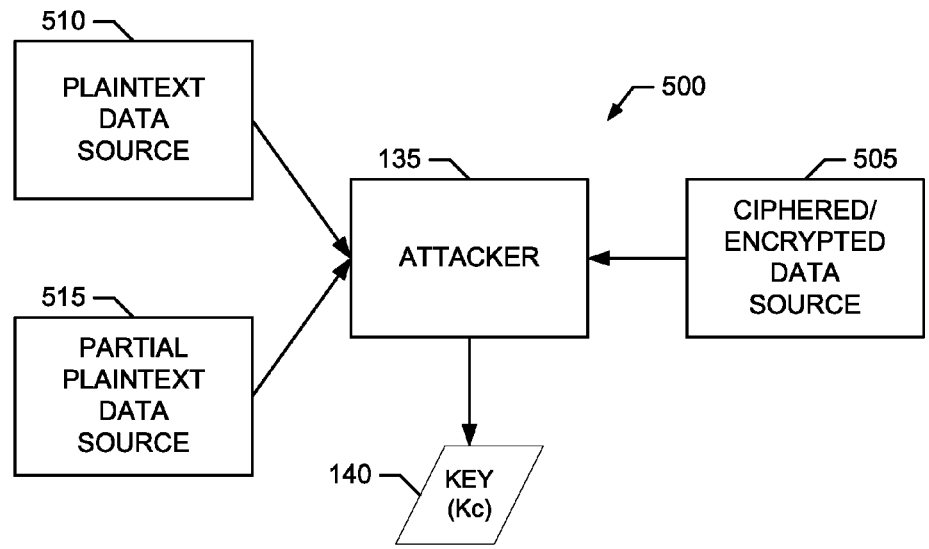
FIG. 5 illustrates an example system that can be used by an attacker to recover a ciphering key employed by the example cipherer and decipherer of FIG. 4.

FIG. 5 illustrates an example system 500 that can be used by the attacker 135 to recover the ciphering key 140 utilized by the cipherer 220 and the decipherer 310 in a mobile network that does not employ the methods and apparatus to secure communications disclosed herein. Because the A5/1 cipher is a stream cipher, the attacker 135 can use a plaintext attack to attempt to discover the ciphering key 140. In a plaintext attack, if the attacker 135 has complete, or at least partial, knowledge of both the ciphered information and the plaintext information, the attacker 135 can deduce the cipher block output by the A5/1 cipher algorithm 405 and, thus the ciphering key 140. For example, the attacker 135 can obtain the ciphered information by monitoring a source 505 of the ciphered information, such as the ciphered SI5 blocks transmitted on a SACCH as encoded in a prior GSM mobile network. The attacker 135 can obtain the plaintext information by receiving a source 510 of the plaintext information, such as the plaintext SI2 blocks broadcast on a BCCH in a GSM mobile network. A plaintext attack against the SACCH as encoded in a prior GSM mobile network can be based on the assumption that the attacker 135 is able to determine at least some of cipher block bits output by the A5/1 cipher algorithm 405 for each TDMA frame. For example, the attacker 135 could determine the cipher block bits to be those bits that when added in a bit-wise modulo-2 addition with the plaintext information bits (after SACCH encoding up to the point prior to ciphering) yield the ciphered information bits. Once the sequence of cipher block bits is determined, the attacker 134 can recover the initial state of the shift registers of the A5/1 cipher algorithm 405 and further determine the ciphering key 140 that was used to generate the cipher block bits. It should be noted that the attacker 135 may potentially need to process a number of SACCH and BCCH blocks to achieve a successful plaintext attack.

In some scenarios, the attacker 135 may achieve a successful plaintext attack on the SACCH as encoded in a prior GSM network even with only partial plaintext information. For example, the attacker 135 may obtain the partial plaintext information by receiving a source 510 of plaintext information, such as the plaintext SI2 blocks broadcast on a BCCH in a GSM mobile network, but in this case only some of the plaintext information bits correspond with only some of the ciphered information bits (e.g., the ciphered SI5 blocks transmitted on a SACCH as encoded in a prior GSM mobile network) obtained from the ciphered information source 505. This may occur when, for example, the attacker 135 knows that some of the information in the ciphered SI5 block may be different from the plaintext information in the same position of the SI2 block. In such a scenario, the attacker 135 may utilize a brute-force search across all permutations of the bits for which there is no correspondence between the plaintext information bits and the ciphered information bits. Although a plaintext attack using only partial plaintext may be more difficult and take longer to complete (e.g., there are 2^M bit combinations to try for M bits for which there is no correspondence between the plaintext information and the ciphered information), the attacker 135 could still achieve a successful plaintext attack once the correct bit combination is tried.

Figure 6:
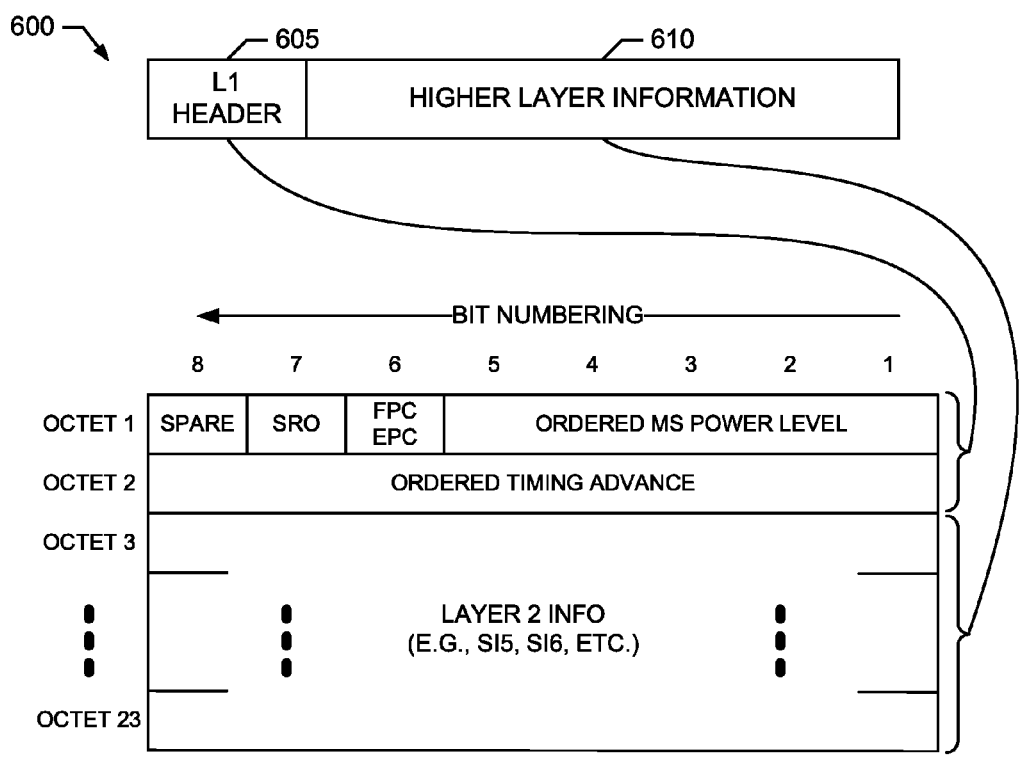
FIG. 6 illustrates an example format for information bits to be communicated on the SACCH.

To provide context for the example methods and apparatus to secure communications disclosed herein, a description of the format of the SACCH information block and the encoding performed on the SACCH information block is provided. An example format for the information block 600 to be communicated on the SACCH 120 is illustrated in FIG. 6. In GSM, the SACCH 120 is one type of dedicated control channel (DCCH) that is stream-ciphered. The SACCH 120 is a downlink channel, and the SACCH information block 600 includes 184 information bits, which include a 16-bit (2-byte) header 605 containing layer-1 (L1) header information, and a 168-bit (21-byte) higher layer portion 610 containing higher layer information (e.g., such as layer-2 information in the form of an SI5 block).

As shown in FIG. 6, the L1 header 605 includes power control information (e.g., 5 bits) referred to as an ordered MS power level in FIG. 6. The L1 header 605 also includes timing advance information (e.g., 8 bits), referred to as an ordered timing advance in FIG. 6. The L1 header 605 further includes a SACCH repetition order indicator (e.g., 1 bit), referred to as SRO in FIG. 6. Additionally, the L1 header 605 includes a fast/enhanced power control indicator (e.g., 1 bit), referred to as FPC EPC in FIG. 6. A spare bit (e.g., 1 bit) is also included to complete the L1 header 605. In some examples, the power control and timing advance information included in the L1 header 605 may vary (e.g., slowly or quickly depending on channel scenarios). In other words, the L1 header 605 may be different in every SACCH block, which introduces a certain level of variation of the bits in the SACCH block 600. As such, the contents of the L1 header 605 may be unknown, in general, to the attacker 135 during a call.

In addition to the L1 header 605, the SACCH information block 600 also includes the higher layer portion 610 that contains 21 octets of higher layer information (e.g., layer-2 information), which may be used to transmit system information. For example, the higher layer portion 610 may contain SI5 and/or SI6 blocks, which include location area identification, the BCCH frequencies of neighbor cells, a number of control parameters for communications within the cell corresponding to the BSS 105, etc. In some examples, the contents of the higher layer portion 610 rarely change after a call setup. Also, and as noted above, at least some of the information in the SI5 (and/or SI6) blocks transmitted on the SACCH 120 are also broadcast unciphered on the BCCH 115, meaning that the attacker 135 may determine some of the SACCH plaintext information by monitoring the BCCH 115.

Figure 7:
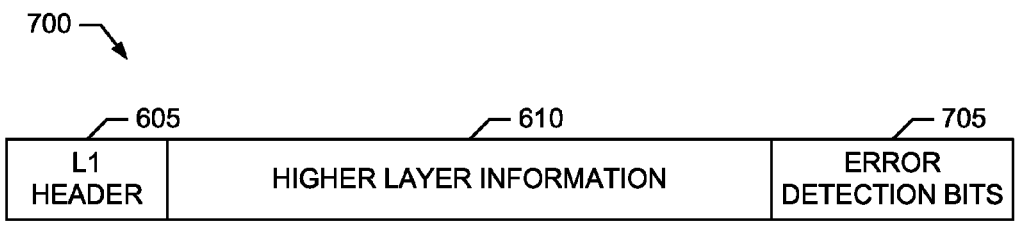
FIG. 7 illustrates an example format for fire coded information bits to be communicated on the SACCH.
Figure 8:
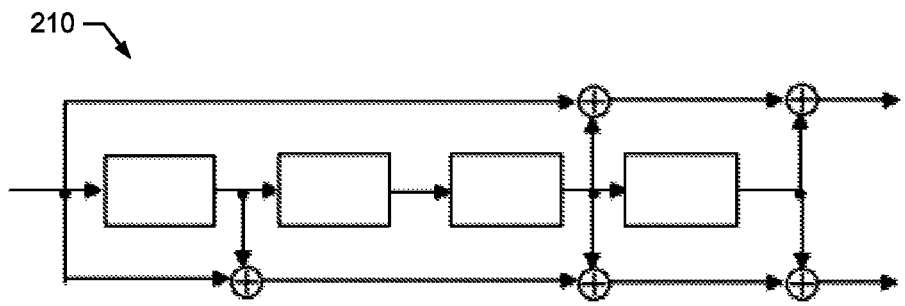
FIG. 8 is a block diagram of an example convolutional encoder that can be used to implement the SACCH encoding chains of FIGS. 2, 9, 13 and/or 15A-B.

Returning to the prior SACCH encoding chain 200 illustrated in FIG. 2, the information bits in the SACCH information block 600 are encoded by the fire encoder 205 with a generator polynomial $g(D)=(D^{23}+1)*(D^{17}+D^3+1)$. An example format of a fire coded data block 700 output from the fire encoder 205 is illustrated in FIG. 7. The fire coded data block 700 includes the 184 information bits of the SACCH block 600 and, in particular, the L1 header 605 and higher-layer portion 610. Additionally, the fire coded data block 700 includes 40 error detection bits appended after the L1 header 605 and higher-layer portion 610. The fire coded data block 700, along with 4 padding/terminating bits, are input to the rate 1/2 non-systematic, non-recursive convolutional encoder 210, which outputs 456 coded bits. An example implementation of the convolutional encoder 210 is illustrated in FIG. 8, which shows how a single input bit yields two coded output bits. As described above, the coded bits output from the convolutional encoder 210 are then interleaved, and burst mapping assigns 114 coded bits (but in plaintext) to each of four bursts. Each of the four bursts is then ciphered by the cipherer(s) 220A-D using modulo-2 addition with 114 cipher block bits for a given TDMA frame to generate four ciphered bursts each containing 114-bit ciphered data blocks.

As discussed above, at least some of the system information transmitted in the SACCH 120 is also broadcast on the BCCH 115. Because the fire coding, convolutional coding, interleaving and burst mapping operations are specified in the GSM standards, the SACCH data bursts before ciphering in prior GSM networks are considered to be in plaintext form because the SACCH information contained in each of these bursts can be generated by the attacker 135 by processing plaintext system information obtained from the BCCH 115 using the known fire coding, convolutional coding, interleaving and burst mapping operations specified in the GSM standards.

The following observations may be made based on the preceding description of SACCH encoding. First, the 40 error detection bits produced by the fire encoder 205 are determined by all 184 SACCH information bits in the SACCH information block 600 using a generator polynomial. Therefore, a change to one of the information bits in the SACCH information block 600 may impact many bits in the parity check.

Second, due to the properties of convolutional encoding, burst mapping and interleaving, a single changed bit in the input of the convolutional encoder 210 (e.g., as illustrated in FIG. 8) can affect 10 coded output bits from the convolutional encoder 210. After interleaving and burst mapping, these 10 coded output bits will be in various non-consecutive locations within the 4 SACCH plaintext bursts (and may not even be in the same burst).

Third, one or more bits in the L1 header 605 of the SACCH block 600 may change from block to block and, therefore, may be considered unknown to the attacker 135. As such, example randomization techniques based on the preceding three observations, which are described in greater detail below, can result in a potentially large number of unknown plaintext bits scattered throughout the SACCH bursts.

Fourth, for the convolutional encoder 210 used to encode the SACCH block 600, an arbitrary state of the shift register (see FIG. 8) will become a known state after 4 known consecutive input bits are input to the convolutional encoder 210. In other words, the convolutional encoder 210 has a memory length in which the output is a function of a current input bit and 4 past input bits.

Fifth, a cipher block of 114 bits output by the A5 ciphering algorithm 405 for a SACCH burst is determined by the ciphering key 410 and the TDMA frame number 415. If the 114 bit plaintext SACCH burst is known (or partially known), the cipher block can be recovered through bitwise modulo-2 binary addition with the corresponding received ciphered SACCH burst. However, if the plaintext SACCH burst is unknown to the attacker 135 (e.g., through randomization as described below), then the cipher block cannot be recovered through bitwise modulo-2 binary addition with the corresponding received ciphered SACCH burst. Furthermore, although the cipher block is changed burst to burst, the transmitter and receiver know the cipher block for each burst because they know the ciphering key 410 and the TDMA frame number 415.

Sixth, the attacker 135 may not consider a relatively small number of bits being unknown in the plaintext SACCH burst to be a deterrent to a plaintext attack. As noted above, the attacker 135 may apply brute force and try all possible variations of these unknown bits to recover the cipher block output from the A5 ciphering algorithm 405 and, thereby, the ciphering key 410.

With the foregoing observations in minds, example techniques to secure SACCH communications in the mobile network 100 by randomizing SACCH plaintext data without changing the SACCH information payload are now described. Examples techniques to randomize the SACCH plaintext data include scrambling the SACCH information block, augmenting and then scrambling the SACCH information block, shuffling a coded version of the SACCH information block, and/or one or more combinations thereof. In some examples, the mobile network 100 enables the mobile station 110 to indicate whether it supports one or more of the example techniques disclosed herein for securing SACCH communications. For example, in the mobile network 100, one or more additional bits could be added to the classmark and mobile station radio access capability (RAC) signaled by the mobile station 110 to the BSS 105 to indicate whether and/or which one or more example techniques disclosed herein for securing SACCH communications are supported by the mobile station 110.

A block diagram of an example SACCH encoding chain 900 utilizing scrambling to randomize SACCH plaintext data to secure communications over the SACCH 120 in the mobile network 100 is illustrated in FIG. 9. The SACCH encoding chain 900 can be used to implement the SACCH encoding chain 125 included in the BSS 105 of FIG. 1. Scrambling as utilized by the SACCH encoding chain 900 is based on the observation above that the L1 header 605 in the SACCH information block 600 has an inherent randomness that makes it possible for L1 header 605 itself to randomize the higher-layer information in the higher-layer portion 610 of the SACCH information block 600. Example scrambling techniques described herein are able to randomize the plaintext SACCH bursts completely, thereby avoiding possible vulnerabilities if only a portion of the plaintext SACCH bursts were randomized.

Turning to FIG. 9, the SACCH encoding chain 900 includes many elements in common with the SACCH encoding chain 200 of FIG. 2. As such, like elements in FIGS. 2 and 9 are labeled with the same reference numerals. In particular, these like elements include the fire encoder 205, the convolutional encoder 210, the interleaver and burst mapper 215, the cipherers 220A-D and the modulators 225A-D. The detailed descriptions of these like elements are provided above in connection with the discussion of FIG. 2 and, in the interest of brevity, are not repeated in the discussion of FIG. 9.

However, unlike the prior art SACCH encoding chain 200 of FIG. 2, the SACCH encoding chain 900 of FIG. 9 also includes an example scrambler 905 to scramble the SACCH information block 600 to randomize the 184 SACCH information bits that are to be input to the fire encoder 205. In the SACCH encoding chain 900 of the illustrated example, the number of scrambled SACCH information bits output by from the scrambler 905 is the same as the number of SACCH information bits input to the scrambler 905. The fire encoder 205 then encodes the randomized SACCH information bits (which adds 40 error detection bits to the 184 randomized SACCH information bits), which after padding by 4 bits are then encoded by the convolutional encoder 210 (with rate 1/2 to yield 456 coded bits) and interleaved and burst mapped by the interleaver and burst mapper 215 to generate randomized, plaintext SACCH bursts that are to be ciphered by the cipherers 220A-D. In other words, the scrambler 905 randomizes the SACCH information block 600 before ciphering such that plaintext SACCH bursts that are to be ciphered by the cipherers 220A-D contain random information that is not comparable to the plaintext information (e.g., SI2 information) broadcast on the BCCH 115.

A block diagram of an example SACCH decoding chain 1000 utilizing descrambling to de-randomize and receive SACCH communications secured using the SACCH encoding chain 900 of FIG. 9 is illustrated in FIG. 10. The SACCH decoding chain 1000 can be used to implement the SACCH decoding chain 130 included in the mobile station 110 of FIG. 1. The SACCH decoding chain 1000 includes many elements in common with the SACCH decoding chain 300 of FIG. 2.

As such, like elements in FIGS. 3 and 10 are labeled with the same reference numerals. In particular, these like elements include the demodulators 305A-D, the decipherers 310A-D, the de-interleaver and burst mapper 215, the convolutional decoder 320 and the fire decoder 325. The detailed descriptions of these like elements are provided above in connection with the discussion of FIG. 3 and, in the interest of brevity, are not repeated in the discussion of FIG. 10.

However, unlike the prior art SACCH decoding chain 300 of FIG. 3, the SACCH decoding chain 1000 of FIG. 10 also includes an example descrambler 1005. Descrambling is performed in the SACCH decoding chain 1000 after fire decoding to recover the SACCH information bits that were scrambled by the scrambler 905. As such, in the SACCH decoding chain 1000, the descrambler 1005 operates on the output of the fire decoder 325 to de-randomize and recover the 184 SACCH information bits communicated via the SACCH 120. In the SACCH decoding chain 1000 of the illustrated example, the number of scrambled SACCH information bits input to the descrambler 1005 is the same as the number of recovered SACCH information bits output from the descrambler 1005.

Figure 11:
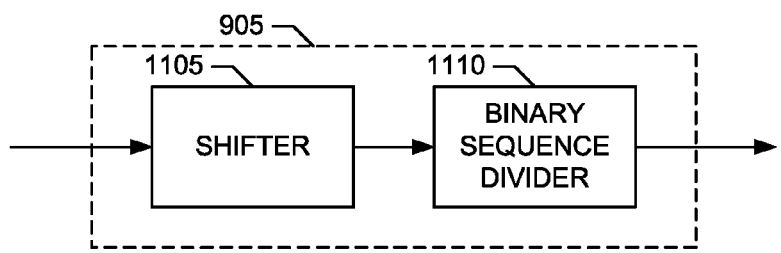
FIGS. 11-12 respectively illustrate block diagrams of an example scrambler and descrambler that can be used to perform scrambling and descrambling in the example SACCH encoding and decoding chains of FIGS. 9 and 10, respectively.
Figure 12:
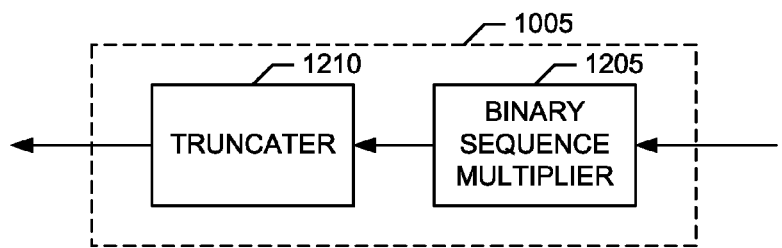

Example implementations of the scrambler 905 of FIG. 9 and the descrambler 1005 of FIG. 10 are illustrated in FIGS. 11 and 12, respectively. Operation of the scrambler 905 of FIG. 11 is described mathematically as follows. Consider an input SACCH information block 600 containing 184 bits represented as $\{i(0), i(1), \ldots, i(183)\}$. An equivalent polynomial representation for this 184-bit SACCH information bit sequence is given by Equation 1:

$$i(D) = i(0)D^{183} + i(1)D^{182} + \ldots + i(183).  \quad \text{Equation 1}$$

The scrambler 905 of the illustrated example scrambles the SACCH information bits by a scrambling factor to yield a pseudo random sequence of 184 bits. In some examples, the scrambler 905 performs scrambling by performing binary sequence division (e.g., division in GF(2) space) to divide the 184-bit SACCH information bit sequence by a scrambling factor that is a scrambling polynomial $d(D)$ of degree K to yield a pseudo random quotient sequence of 184 bits, represented in polynomial form as shown in Equation 2:

$$q(D) = q(0)D^{183} + q(1)D^{182} + \ldots + q(183).  \quad \text{Equation 2}$$

In such an example, the resulting quotient sequence of 184 bits forms the scrambled SACCH information bits, represented as $\{q(0), q(1), \ldots, q(183)\}$.

To perform binary sequence division to scramble the input SACCH information bits using the scrambling factor/polynomial $d(D)$, the scrambler 905 of FIG. 11 includes an example shifter 1105 and an example binary sequence divider 1110. The shifter 1105 shifts the input sequence of SACCH information bits by a number of bits equal to the degree K of the scrambling polynomial $d(D)$ (e.g., to insert K least significant bits). Mathematically, the shifting performed by the shifter 1105 can be represented by multiplying the 184-bit SACCH information bit polynomial $i(D)$ by the factor $D^K$ to yield Equation 3:

$$i(D)D^K = i(0)D^{183+K} + i(1)D^{182+K-1} + \ldots + i(183)D^K.  \quad \text{Equation 3}$$

The binary sequence divider 1110 divides the shifted input sequence of SACCH information bits $(i(D)D^K)$ by the scrambling polynomial $d(D)$ to yield the quotient $q(D)$ that forms the scrambled SACCH information bit sequence. Mathematically, the division performed by the binary sequence divider 1110 can be represented by Equation 4:

$$q(D) = Q_{d(D)}[i(D)D^K].  \quad \text{Equation 4}$$

In Equation 4, $Q_{d(D)}$ denotes calculation of a quotient $q(D)$ using binary sequence division based on the scrambling polynomial $d(D)$.

The degree of randomness of the scrambled SACCH information bits output from the scrambler 905 is based on the number of random bits in the L1 header 605 (e.g., random from the perspective of the attacker 115) and on the degree K of a scrambling polynomial $d(D)$ used by the scrambler 905 to perform scrambling. In some examples, the degree K of the scrambling polynomial $d(D)$ is greater than or equal to the number of bits in the SACCH information block that are unknown to the attacker 135, such as the number of bits (e.g., 16) in the L1 header 605.

Turning to FIG. 12, the operation of the descrambler 1005 of the illustrated example is as follows. As described above, the scrambler 905 scrambles the SACCH information bits by a scrambling factor to yield a pseudo random sequence of 184 bits. In the illustrated example, the descrambler 1005 operates to descramble the pseudo random sequence of 184 bits output by the scrambler 905 using descrambling factor, which may be the same or different from the scrambling factor utilized by the scrambler 905. For example, if the scrambler 905 performs scrambling using binary sequence division (e.g., division in GF(2) space) to divide the 184-bit SACCH information bit sequence by the scrambling factor/polynomial $d(D)$ to yield the pseudo random quotient sequence of 184 bits, then the descrambler 1005 performs binary sequence multiplication (e.g., multiplying in GF(2) space) of the pseudo random quotient sequence of 184 bits $q'(D)$ forming the scrambled information bit sequence by the same scrambling polynomial $d(D)$ to yield the descrambled SACCH information bit sequence $i'(D)$ (here, the symbol "'" is used to differentiate a received sequence from the corresponding transmitted sequence).

To perform binary sequence multiplication to descramble the scrambled information bit sequence $q'(D)$ using the descrambling factor/polynomial $d(D)$ (which is the same as the scrambling factor/polynomial in this example), the descrambler 1005 includes an example binary sequence multiplier 1205 and an example truncater 1210. In the illustrated example, the binary sequence multiplier 1205 multiplies the sequence of scrambled SACCH information bits $q'(D)$ by the scrambling polynomial $d(D)$. Mathematically, the multiplication performed by the binary sequence multiplier 1205 yields a product sequence/polynomial that can be represented by Equation 5:

$$q'(D)d(D) = i'(0)D^{183+K} + i'(1)D^{183+K-1} + \ldots + i'(183)D^K + i'(182)D^{K-1} + \ldots + i'(1)D + i'(0)  \quad \text{Equation 5}$$

The truncater 1210 truncates the product sequence (e.g., sequence of product bits) output from the binary sequence multiplier 1205 by removing a number of bits equal to the degree K of the scrambling polynomial $d(D)$ (e.g., truncating the K least significant bits). Truncation as performed by the truncater 1210 undoes the shifting performed by the shifter 1105. Mathematically, the truncation performed by the truncater 1210 on the product sequence yields the original SACCH information bit sequence $i'(0), i'(1), \ldots, i'(183)$.

In some examples, the scrambling polynomial $d(D)$ utilized by the scrambler 905 and descrambler 1005 be fixed (e.g., through standardization in the GSM specifications). In other examples, the scrambling polynomial $d(D)$ can dynamically change and potentially be unknown to the attacker 135. For example, it is possible to derive a dynamic scrambling polynomial $d_x(D)$ based on the cipher block used for the first burst of the SACCH block. As noted above, the cipher block output by the A5/1 cipher algorithm 405 for a SACCH burst is known by both the transmitter and receiver and, thus, can be used to randomize the SACCH information bits before channel coding.

For example, let the scrambling polynomial d(D) be a dynamic scrambling polynomial $d_x(D)$ (where "x" indicates that the scrambling polynomial can vary) of degree K, which can be written mathematically as given by Equation 6:

$$d(x) = D^K + d_{K-1} D^{K-1} + \ldots + d_1 D + 1. \qquad \text{Equation 6}$$

For each SACCH block, a new dynamic scrambling polynomial $d_x(D)$ (i.e., $d_{K-1}, \ldots, d_1$) can be generated based on the cipher block for the first burst of the SACCH block in many different ways (e.g., such as by selecting individual bits and/or combinations of bits from the cipher block to be the coefficients of the dynamic scrambling polynomial). Because the cipher block is pseudo-randomly generated by the ciphering key 410 and the TDMA frame number 415, and is known by both transmitter and receiver, the generated scrambling polynomial $d_x(D)$ is pseudo random and unknown to the attacker 135, but is known by both transmitter and receiver.

In some examples, scrambling and descrambling as implemented by the SACCH encoding chain 900 and the SACCH decoding chain 1000 adds little signaling overhead to the mobile network 100 (e.g., an ability for the BSS 105 and the mobile station 110 to signal that each can support scrambling and descrambling, such as that provided by the SACCH encoding chain 900 and the SACCH decoding chain 1000, can be sufficient in some examples). Also, scrambling and descrambling as implemented by the SACCH encoding chain 900 and the SACCH decoding chain 1000 can have no impact on higher-layer information. Furthermore, the legacy SACCH encoding operations of fire and convolutional coding, interleaving and ciphering are unchanged and, as such, the SACCH block error rate performance can remain unchanged after the introduction of scrambling and descrambling as implemented by the SACCH encoding chain 900 and the SACCH decoding chain 1000.

A block diagram of an example SACCH encoding chain 1300 utilizing augmentation and scrambling to randomize SACCH plaintext data to secure communications over the SACCH 120 in the mobile network 100 is illustrated in FIG. 13. The SACCH encoding chain 1300 can be used to implement the SACCH encoding chain 125 included in the BSS 105 of FIG. 1. The SACCH encoding chain 1300 includes many elements in common with the SACCH encoding chains 200 and 900 of FIGS. 2 and 9, respectively. As such, like elements in FIGS. 2, 9 and 13 are labeled with the same reference numerals. In particular, these like elements include the fire encoder 205, the interleaver and burst mapper 215, the cipherers 220A-D and the modulators 225A-D. The detailed descriptions of these like elements are provided above in connection with the discussion of FIGS. 2 and 9 and, in the interest of brevity, are not repeated in the discussion of FIG. 13

As described in greater detail below, the SACCH encoding chain 1300 includes an example scrambler 1305, which may be similar to the scrambler 905 of FIGS. 9 and 11 that is included in the SACCH encoding chain 900, although modified to handle longer input and output bit streams. However, unlike the SACCH encoding chain 900, the SACCH encoding chain 1300 also includes an example augmenter 1310 to augment the input SACCH information block 600 with additional random bits, which may further improve the randomness of the plaintext SACCH bursts that can be generated by the SACCH encoding chain 1300. In the illustrated example, the augmenter 1310 augments the 184 input SACCH information bits in the block 600 with A augmenting bits, where A can be any value (e.g., such as 8, 16, 24, 32, 40, etc.). The A augmenting bits can be generated using any technique. For example, A augmenting bits can be generated using a pseudo-random number generator, a random process, etc., such that the A augmenting are unknown to the attacker 135. Furthermore, the A augmenting bits may also be unknown to an intended receiver of the SACCH 120 (e.g., such as the mobile station 110).

In the SACCH encoding chain 1300, the 184+A augmented bits are scrambled by the scrambler 1305 through sequential division by a generator polynomial d(D) of degree K as described above in the context of the scrambler 905. Like for the scrambler 905, the number of scrambled bits output by from the scrambler 1305 is the same as the number of bits input to the scrambler 1305 (which is 184+A in the illustrated example). The fire encoder 205 then fire-encodes the randomized, augmented SACCH information bits (which adds 40 error detection bits to the 184+A randomized, augmented SACCH information bits), which are then encoded by the convolutional encoder 1315. The convolutional encoder 1315 performs rate 1/2 convolutional encoding like the convolutional encoder 210 but, unlike the convolutional encoder 210, the convolutional encoder 1315 also performs puncturing. For example, without puncturing, the convolutional encoder 1315 would output 456+2A coded bits. Accordingly, the convolutional encoder 1315 employs any appropriate puncturing technique to puncture (e.g., remove) 2A of the coded bits such that the output of the convolutional encoder 210 is 456 coded bits. The remainder of the SACCH encoding chain 1300 operates as in the SACCH encoding chains 200 and/or 900.

Puncturing increases the effective coding rate (e.g., and thus reduces the effective coding gain) provided by the convolutional encoder 1315 by an amount proportional to the number of augmenting bits added to the SACCH information bit sequence. For example, to show this dependence on the number of augmentation bits, the effective coding rate Rc of the convolutional encoder 1315 can be expressed mathematically by Equation 7:

$$Rc = \frac{184 + A + 40}{456} = \frac{28}{57} + \frac{A}{456}. \qquad \text{Equation 7}$$

As a non-limiting example, if the number of augmenting bits is A=16, then the SACCH convolutional encoding rate increases from 0.5 to approximately 0.5351, resulting in a signal-to-noise ratio loss of approximately 0.3 dB. The SACCH encoding chain 1300, therefore, provides the ability to trade-off coding performance with resilience to plaintext attacks through information randomization to tailor the SACCH encoding chain 1300 to a particular operating environment.

Operation of the SACCH encoding chain 1300 of FIG. 13 is described mathematically as follows. Consider an input SACCH information block 600 containing a 184-bit SACCH information bit sequence bits represented as {i(0), i(1), . . . , i(183)} with an equivalent polynomial representation given by Equation 1. The augmenter 1310 augments the SACCH information bit sequence i(D) with A augmenting bits a(0), a(1), . . . , a(A−1) to generate a block of augmented bits s={s(0), s(1), . . . , s(184+A−1)} with a polynomial representation given by Equation 8:

$$s(D) = s(0)D^{184+A-1} + s(1)D^{184+A-2} + \ldots + \quad \text{Equation 8}$$
$$s(184 + A - 1)$$
$$= a(0)D^{184+A-1} + a(1)D^{184+A-2} + \ldots +$$
$$a(K)D^{184} + i(0)D^{183} + i(1)D^{182} + \ldots + i(183)$$

The scrambler 1305, similar to the scrambler 905, scrambles the augmented SACCH information bit sequence s(D) by performing binary sequence division (e.g., division in GF(2) space) to divide the 184+A-bit augmented information bit sequence by a scrambling factor that is a scrambling polynomial d(D) of degree K to yield a pseudo random quotient sequence of 184+A bits that forms the scrambled, augmented information bit sequence q(D) given by Equation 9:

$$q(D) = q(0)D^{184+A-1} + q(1)D^{184+A-2} + \ldots + q(184+A-1) \quad \text{Equation 9}$$

For example, the scrambler 1305 can be implemented in a manner similar to the example of FIG. 11 in which scrambling is performed by shifting the augmented information bit sequence by an amount equal to the degree K of the scrambling polynomial d(D), and then performing binary division on the shifted result. In such an example, shifting of the 184+A-bit augmented SACCH information bit sequence can be represented by multiplying its polynomial representation by the factor $D^K$ to yield Equation 10:

$$s(D)D^K = s(0)D^{184+A-1+K} + s(1)D^{184+A-2+K} + \ldots + s(184+A-1)D^K \quad \text{Equation 10}$$

Binary division of the shifted bit sequence of Equation 10 results in the quotient bit sequence q(D) given by Equation 11:

$$q(D) = Q_{d(D)}[s(D)D^K] = q(0)D^{184+A-1} + q(1)D^{184+A-2} + \ldots + q(184+A-1) \quad \text{Equation 11}$$

The quotient bit sequence q(D) becomes the scrambled, augmented bit sequence output from the scrambler 1305.

A block diagram of an example SACCH decoding chain 1400 utilizing descrambling and de-augmentation to receive SACCH communications secured using the SACCH encoding chain 1300 of FIG. 13 is illustrated in FIG. 14. The SACCH decoding chain 1400 can be used to implement the SACCH decoding chain 130 included in the mobile station 110 of FIG. 1. The SACCH decoding chain 1400 includes many elements in common with the SACCH decoding chains 300 and 1000 of FIGS. 3 and 10, respectively. As such, like elements in FIGS. 3, 10 and 14 are labeled with the same reference numerals. In particular, these like elements include the demodulators 305A-D, the decipherers 310A-D, the de-interleaver and burst mapper 215 and the fire decoder 325. The detailed descriptions of these like elements are provided above in connection with the discussions of FIGS. 3 and 10 and, in the interest of brevity, are not repeated in the discussion of FIG. 14.

Turning to FIG. 14, the SACCH decoding chain 1400 includes an example convolutional decoder 1405 that performs data filling to counter the puncturing performed by the convolutional encoder 1315 in the SACCH encoding chain 1300. Such data filling can be performed using any appropriate technique. The SACCH decoding chain 1400 also includes an example descrambler 1410, which may be similar to the descrambler 1005 of FIGS. 10 and 12 that is included in the SACCH decoding chain 1000, although modified to handle longer input and output bit streams. Descrambling is performed in the SACCH decoding chain 1400 after fire decoding to recover the augmented SACCH information bits that were scrambled by the scrambler 1305. As such, in the SACCH decoding chain 1400, the descrambler 1410 operates on the output of the fire decoder to recover the 184+A augmented SACCH information bit sequence produced by the augmenter 1310. The SACCH decoding chain 1400 further includes an example de-augmenter 1415 to remove (e.g., truncate) the A augmenting bits added to the SACCH information bit sequence. The output of the de-augmenter 1415 is the 184-bit SACCH information block 600 transmitted by the SACCH encoding chain 1300 on the SACCH 120.

Figure 15A:
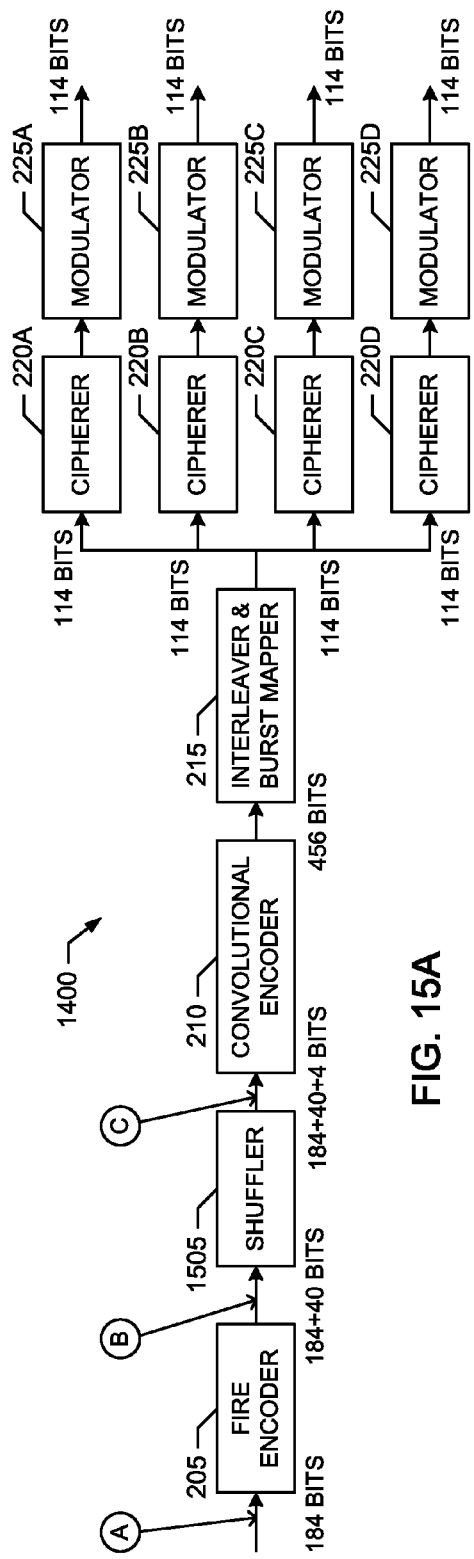
FIGS. 15A-B illustrate a block diagram of an example SACCH encoding chain using shuffling in accordance with the example methods and apparatus disclosed herein to secure communications in the example mobile network of FIG. 1.
Figure 15B:
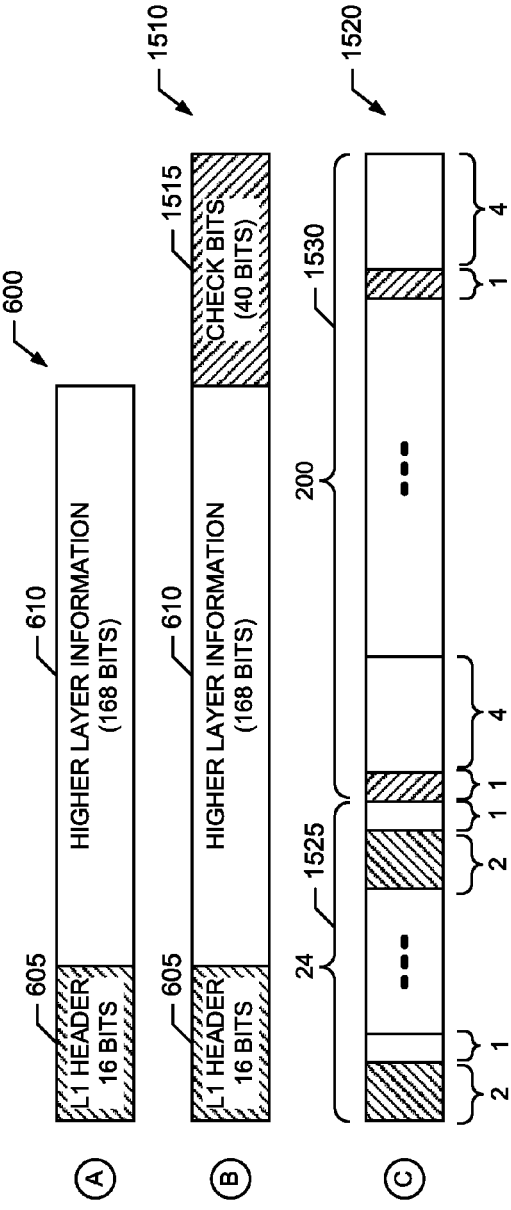

A block diagram of an example SACCH encoding chain 1500 utilizing shuffling to randomize SACCH plaintext data to secure communications over the SACCH 120 in the mobile network 100 is illustrated in FIGS. 15A-B. The SACCH encoding chain 1500 can be used to implement the SACCH encoding chain 125 included in the BSS 105 of FIG. 1. Shuffling as utilized by the SACCH encoding chain 1500 is based on the observations above that the L1 header 605 in the SACCH information block 600 and the error detection bits added by the fire coder 205 have random characteristics that makes it possible to randomize the higher-layer information in the higher-layer portion of the SACCH information block 600. Example shuffling techniques described herein are able to randomize the plaintext SACCH bursts completely, thereby avoiding possible vulnerabilities if only a portion of the plaintext SACCH bursts were randomized.

Turning to FIG. 15A, the SACCH encoding chain 1500 includes many elements in common with the SACCH encoding chain 200 of FIG. 2. As such, like elements in FIGS. 2 and 15A are labeled with the same reference numerals. In particular, these like elements include the fire encoder 205, the convolutional encoder 210, the interleaver and burst mapper 215, the cipherers 220A-D and the modulators 225A-D. The detailed descriptions of these like elements are provided above in connection with the discussion of FIG. 2 and, in the interest of brevity, are not repeated in the discussion of FIG. 15A.

However, unlike the prior art SACCH encoding chain 200 of FIG. 2, the SACCH encoding chain 1500 of FIG. 15A also includes an example shuffler 1505 to shuffle the SACCH information block 600 by shuffling the 184 SACCH information bits and 40 error detection bits that are output from the fire encoder 205. Shuffling of the fire-encoded SACCH bits as performed by the example shuffler 1505 involves breaking up consecutive known plaintext information in the higher-layer portion 610 of the SACCH information block 600 using the pseudo-random bits from the L1 header 605 and the pseudo-random error detection bits determined by the fire coder 205 (where these bits are pseudo-random at least from the perspective of the attacker 135). In some examples, shuffling as performed by the shuffler 1505 involves interleaving a predetermined number of bits from the L1 header 605 with a predetermined number bits from the higher-layer portion 610 of the SACCH information block 600, and interleaving a predetermined number error detection bits output from the fire encoder 205 with another (e.g., same or different) predetermined number of bits from the higher-layer portion 610 of the SACCH information block 600. The shuffled, fire-encoded SACCH bits that are output from the shuffler 1505 are then encoded by the convolutional encoder 210 (with rate 1/2 to yield 456 coded bits), which provides a further randomization. The coded output bit sequence from the convolutional encoder 210 is then interleaved and burst mapped by the interleaver and burst mapper 215 to generate randomized, plaintext SACCH bursts that are to be ciphered by the cipherers 220A-D. In other words, the shuffler 1505 randomizes the SACCH information block 600 before ciphering such that plaintext SACCH bursts that are to be ciphered by the cipherers 220A-D contain random information that is not comparable to the plaintext information (e.g., SI2 information) broadcast on the BCCH 115.

FIG. 15B illustrates an example operation of the shuffler 1505. In particular, FIG. 15B illustrates three example bit sequences at three different points marked A, B and C in the SACCH encoding chain 1500. The SACCH information block 600 is the SACCH information bit sequence at point A in the SACCH encoding chain 1500 and includes the L1 header 605 and higher-layer message portion 610 described above. The example bit sequence 1510 corresponds to the fire-coded bits sequence output from the fire coder 205 at point B in the SACCH encoding chain 1500. As such, the fire-coded information bit sequence 1510 includes the L1 header 605, the higher-layer message portion 610 and the error detection bits 1515.

FIG. 15B also illustrates an example bit sequence 1520 that corresponds to the shuffled bit sequence output from the shuffler 1505. In FIG. 15B, different shading is used for the different types of bits (e.g., L1, higher-layer and error detection) to illustrate how the different types of bits are shuffled to form the shuffled bit sequence 1520. In the illustrated example, the shuffled bit sequence 1520 includes a first example shuffled bit subset 1525 and a second example shuffled bit subset 1530. The first shuffled bit subset 1525 includes a mixture of the L1 header bits from the L1 header 605 and a first group of the higher-layer bits from the higher-layer message portion 610. The second shuffled bit subset 1530 includes a mixture of the error detection bits 1515 and a second group of the higher-layer bits from the higher-layer message portion 610. For example, which is not meant to be limiting, in FIG. 15B the first shuffled bit subset 1525 is shown to contain groups of three (3) bits that sequentially include successive pairs of L1 header bits from the L1 header 605 intermixed by a successive next higher-layer bit from the higher-layer message portion 610. The second shuffled bit subset 1530 as shown in FIG. 15B is shown to contains groups of five (5) bits that sequentially include successive groups of, for example, four (4) consecutive successive higher-layer bits from the higher-layer message portion 610 intermixed by a successive next error detection bit from the group of error detection bits 1515. In other examples, the shuffler 1505 can implement any type of shuffling pattern in which, for example, the number of known (e.g., higher-layer information) bits appearing consecutively in the shuffled bit sequence is less than a number, such as a being less than predetermined number (e.g., which is five (5) in the illustrated exampled) corresponding to the memory length of the convolutional encoder 210.

Mathematically, the example operation of the shuffler 1505 as illustrated in FIG. 15B is described as follows. Assume that the L1 header bits from the L1 header 605 are represented by the sequence $\{1(0), 1(1), \ldots, 1(15)\}$, the higher-layer information (e.g., system information) bits from the higher-layer portion 610 are represented by the sequence $\{s(0), s(1), \ldots, s(167)\}$, and the error detection bits are represented by the sequence $\{p(0), p(1), \ldots, p(39)\}$. Using this notation, the polynomial representation of the SACCH information block 600 is given by Equation 12

$$\text{Info} = l(0)D^{183} + l(1)D^{182} + \ldots + l(15)D^{168} + s(0)D^{167} + s(1)D^{166} + \ldots + s(167) \quad \text{Equation 12}$$

and the polynomial representation of the fire-coded information bit sequence 1510 is given by Equation 13:

$$\text{FireCode} = l(0)D^{223} + l(1)D^{222} + \ldots + l(15)D^{208} + s(0)D^{207} + s(1)D^{206} + \ldots + s(167)D^{40} + p(0)D^{39} + p(1)D^{40-2} + \ldots + p(39) \quad \text{Equation 13}$$

Finally, the shuffling performed by the shuffler 1505 to yield the shuffled bit sequence 1520 is given by Equation 14:

$$\text{Shuffled} = l(0)D^{223} + l(1)D^{222} + s(0)D^{221} + \ldots + l(14)D^{202} + l(15)D^{201} + s(7)D^{200} + p(0)D^{199} + s(8)D^{198} + s(9)D^{197} + s(10) + s(10)D^{196} + s(11)D^{195} + \ldots + p(39)D^4 + s(164)D^3 + s(165)D^2 + s(166)D + s(167) \quad \text{Equation 14}$$

Figure 16:
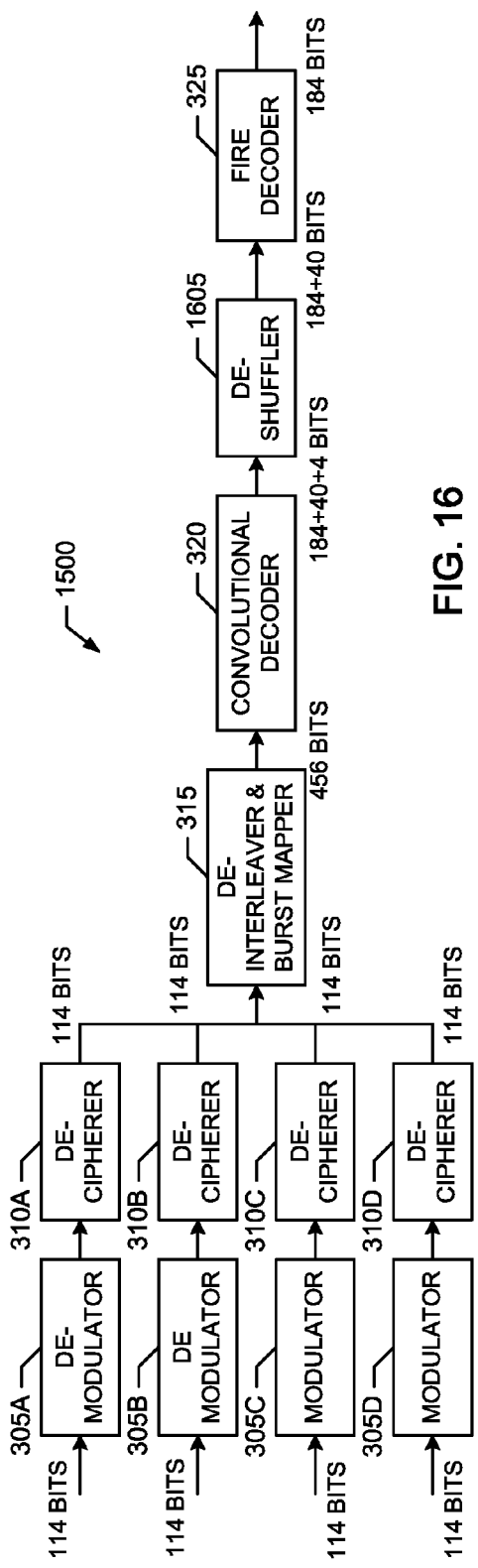
FIG. 16 is a block diagram of an example SACCH decoding chain using deshuffling in accordance with the example methods and apparatus disclosed herein to secure communications in the example mobile network of FIG. 1.

A block diagram of an example SACCH decoding chain 1600 utilizing deshuffling to receive SACCH communications secured using the SACCH encoding chain 1500 of FIGS. 15A-B is illustrated in FIG. 16. The SACCH decoding chain 1600 can be used to implement the SACCH decoding chain 130 included in the mobile station 110 of FIG. 1. The SACCH decoding chain 1600 includes many elements in common with the SACCH decoding chain 300 of FIG. 2. As such, like elements in FIGS. 3 and 16 are labeled with the same reference numerals. In particular, these like elements include the demodulators 305A-D, the decipherers 310A-D, the de-interleaver and burst mapper 215, the convolutional decoder 320 and the fire decoder 325. The detailed descriptions of these like elements are provided above in connection with the discussion of FIG. 3 and, in the interest of brevity, are not repeated in the discussion of FIG. 16.

However, unlike the prior art SACCH decoding chain 300 of FIG. 3, the SACCH decoding chain 1600 of FIG. 16 also includes an example deshuffler 1605. Deshuffling is performed in the SACCH decoding chain 1600 before fire decoding to recover the fire coded SACCH information bits that were shuffled by the shuffler 1505. As such, in the SACCH decoding chain 1000, the deshuffler 1005 operates on the output of the convolutional decoder 320 to recover the 184+40 fire-coded SACCH information bits, which are decoded by the fire decoder 325 to yield the 184 SACCH information bits transmitted via the SACCH 120.

In some examples, shuffling and deshuffling as implemented by the SACCH encoding chain 1500 and the SACCH decoding chain 1600 adds little signaling overhead to the mobile network 100 (e.g., an ability for the BSS 105 and the mobile station 110 to signal that each can support shuffling and deshuffling, such as that provided by the SACCH encoding chain 1500 and the SACCH decoding chain 1600, can be sufficient in some examples). Also, shuffling and deshuffling as implemented by the SACCH encoding chain 1500 and the SACCH decoding chain 1600 can have no impact on higher-layer information. Furthermore, the legacy operations of coding, interleaving and ciphering are unchanged and, as such, the SACCH block error rate performance can remain unchanged after the introduction of shuffling and deshuffling as implemented by the SACCH encoding chain 1500 and the SACCH decoding chain 1600.

Figure 17:
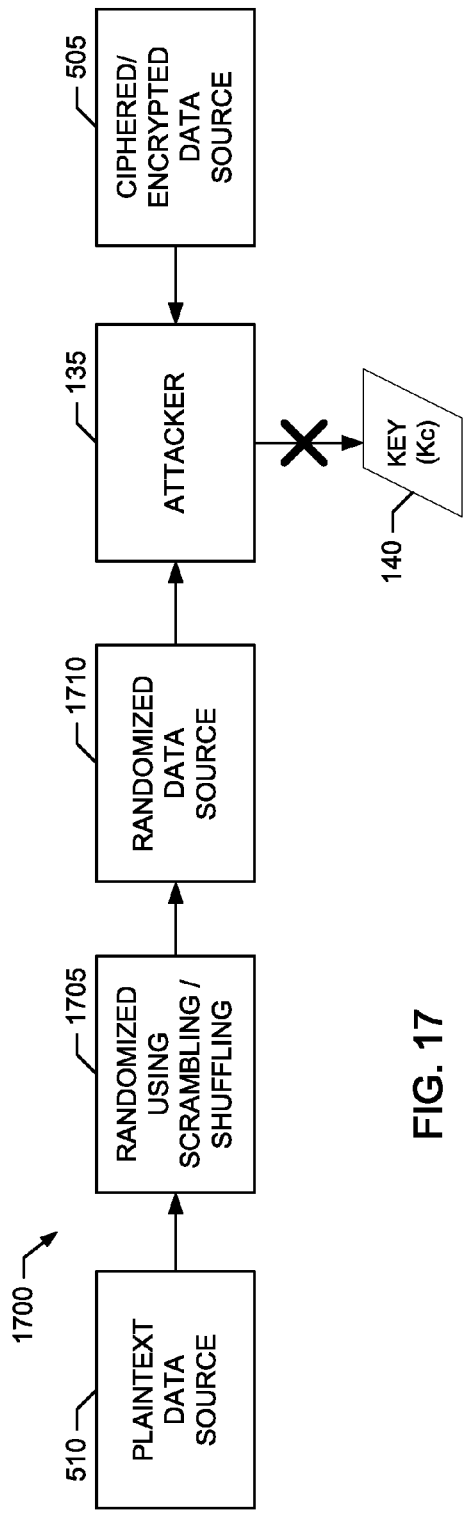
FIG. 17 illustrates an example effect of securing communications in accordance with the example methods and apparatus disclosed herein on the example system of FIG. 5.

FIG. 17 illustrates an example of the effectiveness of SACCH plaintext randomization as described herein on thwarting a plaintext attack attempted by the attacker 135 using the system 500 of FIG. 5. As illustrated in FIG. 17, SACCH plaintext randomization (block 1705) via, for example, scrambling, augmentation and scrambling and/or shuffling as disclosed herein effectively turns the plaintext data source 510 into a randomized data source 1710. As such, the attacker 135 no longer has plaintext data to compare with ciphered data from the ciphered data source 505 to discover the ciphering key 140, thereby thwarting the ability of the attacker 135 to discover the key 140 (e.g., represented by the bold "X" in FIG. 17) without expending substantially more resources than in a typical plaintext attack.

While an example manners of implementing the SACCH encoding chains 125, 900, 1300 and/or 1500 and the SACCH decoding chain 130, 1000, 1400 and/or 1600 have been illustrated in the preceding figures, one or more of the elements, processes and/or devices illustrated in the preceding figures may be combined, divided, re-arranged, omitted, eliminated and/or implemented in any other way. Further, the example SACCH encoding chains 125, 900, 1300 and/or 1500, the example SACCH decoding chain 130, 1000, 1400 and/or 1600, the example fire encoder 205, the example convolutional encoder 210, the example interleaver and burst mapper 215, the example cipherers 220A-D, the example modulators 225A-D, the example demodulators 305A-D, the example decipherers 310A-D, the example de-interleaver and burst mapper 215, the example convolutional decoder 320, the example fire decoder 325, the example A5 cipher algorithm 405, the example scrambler 905, the example descrambler 1005, the example shifter 1105, the example binary sequence divider 1110, the example binary sequence multiplier 1205, the example truncater 1210, the example scrambler 1305, the example augmenter 1310, the example convolutional encoder 1315, the example convolutional decoder 1405, the example descrambler 1410, the example de-augmenter 1415, the example shuffler 1505 and/or the example deshuffler 1605 may be implemented by hardware, software, firmware and/or any combination of hardware, software and/or firmware. Thus, for example, any of the example SACCH encoding chains 125, 900, 1300 and/or 1500, the example SACCH decoding chain 130, 1000, 1400 and/or 1600, the example fire encoder 205, the example convolutional encoder 210, the example interleaver and burst mapper 215, the example cipherers 220A-D, the example modulators 225A-D, the example demodulators 305A-D, the example decipherers 310A-D, the example de-interleaver and burst mapper 215, the example convolutional decoder 320, the example fire decoder 325, the example A5 cipher algorithm 405, the example scrambler 905, the example descrambler 1005, the example shifter 1105, the example binary sequence divider 1110, the example binary sequence multiplier 1205, the example truncater 1210, the example scrambler 1305, the example augmenter 1310, the example convolutional encoder 1315, the example convolutional decoder 1405, the example descrambler 1410, the example de-augmenter 1415, the example shuffler 1505 and/or the example deshuffler 1605 could be implemented by one or more circuit(s), programmable processor(s), application specific integrated circuit(s) (ASIC(s)), programmable logic device(s) (PLD(s)) and/or field programmable logic device(s) (FPLD(s)), etc. In at least some example implementations, at least one of the example SACCH encoding chains 125, 900, 1300 and/or 1500, the example SACCH decoding chain 130, 1000, 1400 and/or 1600, the example fire encoder 205, the example convolutional encoder 210, the example interleaver and burst mapper 215, the example cipherers 220A-D, the example modulators 225A-D, the example demodulators 305A-D, the example decipherers 310A-D, the example de-interleaver and burst mapper 215, the example convolutional decoder 320, the example fire decoder 325, the example A5 cipher algorithm 405, the example scrambler 905, the example descrambler 1005, the example shifter 1105, the example binary sequence divider 1110, the example binary sequence multiplier 1205, the example truncater 1210, the example scrambler 1305, the example augmenter 1310, the example convolutional encoder 1315, the example convolutional decoder 1405, the example descrambler 1410, the example de-augmenter 1415, the example shuffler 1505 and/or the example deshuffler 1605 are hereby expressly defined to include a tangible computer readable medium such as a memory, digital versatile disk (DVD), compact disk (CD), etc., storing such software and/or firmware. Further still, the example SACCH encoding chains 125, 900, 1300 and/or 1500, and/or the example SACCH decoding chain 130, 1000, 1400 and/or 1600 in the preceding figures may include one or more elements, processes and/or devices in addition to, or instead of, those illustrated in the preceding figures, and/or may include more than one of any or all of the illustrated elements, processes and devices.

Flowcharts representative of example processes that may be executed to implement the example SACCH encoding chains 125, 900, 1300 and/or 1500, the example SACCH decoding chain 130, 1000, 1400 and/or 1600, the example fire encoder 205, the example convolutional encoder 210, the example interleaver and burst mapper 215, the example cipherers 220A-D, the example modulators 225A-D, the example demodulators 305A-D, the example decipherers 310A-D, the example de-interleaver and burst mapper 215, the example convolutional decoder 320, the example fire decoder 325, the example A5 cipher algorithm 405, the example scrambler 905, the example descrambler 1005, the example shifter 1105, the example binary sequence divider 1110, the example binary sequence multiplier 1205, the example truncater 1210, the example scrambler 1305, the example augmenter 1310, the example convolutional encoder 1315, the example convolutional decoder 1405, the example descrambler 1410, the example de-augmenter 1415, the example shuffler 1505 and/or the example deshuffler 1605 are shown in FIGS. 18-27. In these examples, the process represented by each flowchart may be implemented by one or more programs comprising machine readable instructions for execution by a processor, such as the processor 2812 shown in the example processing system 2800 discussed below in connection with FIG. 28. Alternatively, the entire program or programs and/or portions thereof implementing one or more of the processes represented by the flowcharts of FIGS. 18-27 could be executed by a device other than the processor 2812 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 18-27, or one or more portion(s) thereof, may be implemented manually. Further, although the example processes are described with reference to the flowcharts illustrated in FIGS. 18-27, many other techniques for implementing the example methods and apparatus described herein may alternatively be used. For example, with reference to the flowcharts illustrated in FIGS. 18-27, the order of execution of the blocks may be changed, and/or some of the blocks described may be changed, eliminated, combined and/or subdivided into multiple blocks.

As mentioned above, the example processes of FIGS. 18-27 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 18-27 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 20:
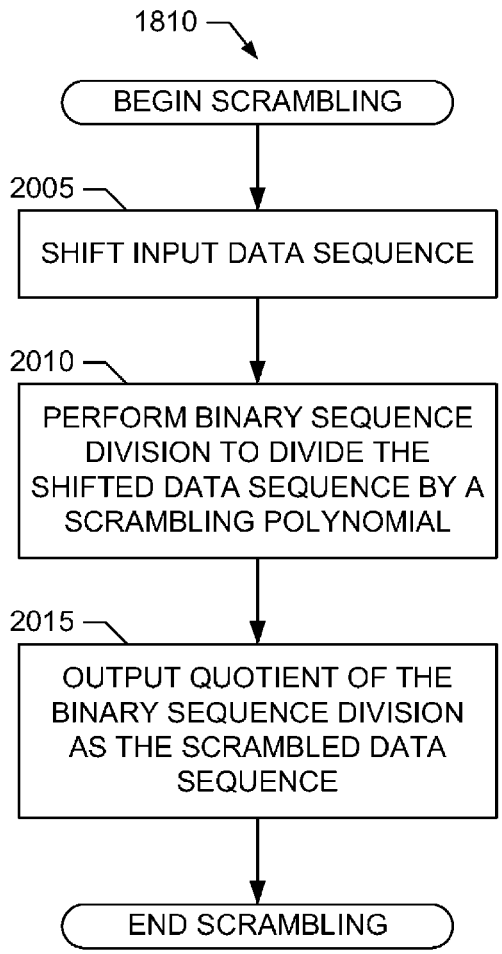
FIG. 20 is a flowchart representative of an example process to perform scrambling that may be used to implement the example process of FIG. 18 and/or performed to implement the example scrambler of FIG. 11.

An example process 1800 that may be executed to implement the example SACCH encoding chain 900 of FIG. 9 is illustrated in FIG. 18. With reference to FIG. 9, the example process 1800 begins execution at block 1805 at which the SACCH encoding chain 900 obtains an input SACCH information block 600 of SACCH information bits to be transmitted on the SACCH 120. At block 1810, the scrambler 905 scrambles the SACCH information bits obtained at block 1805. An example process to perform scrambling at block 1810 is illustrated in FIG. 20, which is described in greater detail below.

At block 1815, the fire encoder 205 fire-encodes the scrambled information bits determined at block 1810. At block 1820, the convolutional encoder 210 encodes the fire-coded, scrambled bits determined at block 1815. At block 1825, the interleaver and burst mapper 215 interleaves and maps the convolutionally coded, scrambled bits to yield four scrambled, plaintext SACCH bursts. At block 1830, the scrambled, plaintext SACCH bursts determined at block 1825 are ciphered by the cipherer(s) 220A-D using A5/1 ciphering. At block 1835, the ciphered SACCH bursts determined at block 1830 are modulated by the modulator(s) 225A-D for transmission on the SACCH 120.

An example process 1900 that may be executed to implement the example SACCH decoding chain 1000 of FIG. 10 is illustrated in FIG. 19. With reference to FIG. 10, the example process 1900 begins execution at block 1905 at which the demodulator(s) 305A-D demodulate four ciphered SACCH bursts received on the SACCH 120. At block 1910, the decipherers 310A-D decipher the demodulated SACCH bursts to obtain four scrambled, plaintext SACCH bursts. At block 1915, the four scrambled, plaintext SACCH bursts are de-interleaved and burst mapped by the de-interleaver and burst mapper 215 to obtain the convolutionally coded, scrambled SACCH bits. At block 1920, the convolutionally coded, scrambled SACCH bits are decoded by the convolutional decoder 320 to obtain the fire-coded, scrambled bits. At block 1925, the fire decoder 325 performs fire decoding of the fire-coded, scrambled bits determined at block 1920 to obtain the scrambled SACCH information bits.

Figure 21:
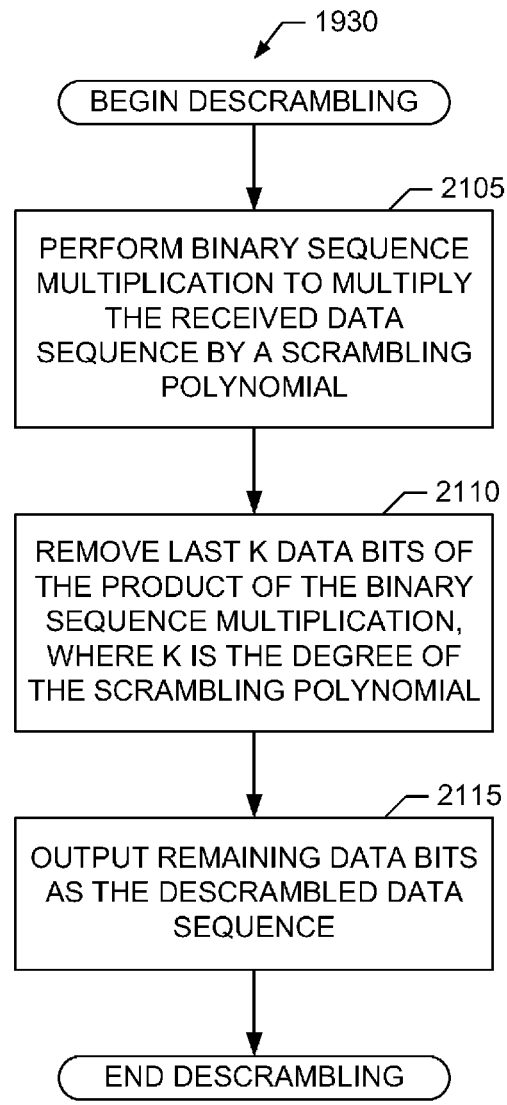
FIG. 21 is a flowchart representative of an example process to perform descrambling that may be used to implement the example process of FIG. 19 and/or performed to implement the example descrambler of FIG. 12.

At block 1930, the descrambler 1005 descrambles the scrambled SACCH information bits determined at block 1925. An example process to perform descrambling at block 1930 is illustrated in FIG. 21, which is described in greater detail below. At block 1935, the SACCH decoding chain 1000 obtains from the descrambler 1005 the original SACCH information bits forming the SACCH information block 600 that was transmitted on the SACCH 120.

An example scrambling process 1810 that may be used to implement the scrambler 905 of FIGS. 9 and/or 11, and/or to perform the processing at block 1810 of FIG. 18 is illustrated in FIG. 20. With reference to FIGS. 9 and 11, the example process 1810 of FIG. 20 begins execution at block 2005 at which the shifter 1105 of the scrambler 905 shifts the input SACCH information bit sequence by an amount corresponding to the degree of a scrambling polynomial to be used to perform scrambling. At block 2010, the binary sequence divider 1110 of the scrambler 905 performs binary division to divide the shifted SACCH information bit sequence by the scrambling polynomial. At block 2015, the binary sequence divider 1110 outputs the quotient bit sequence resulting from the binary division performed at block 2010. The quotient bit sequence output at block 2015 forms the scrambled SACCH information bit sequence.

An example descrambling process 1930 that may be used to implement the descrambler 1005 of FIGS. 10 and/or 12, and/or to perform the processing at block 1930 of FIG. 19 is illustrated in FIG. 21. With reference to FIGS. 10 and 12, the example process 1930 of FIG. 21 begins execution at block 2105 at which the binary sequence multiplier 1205 of the descrambler 1005 performs binary multiplication to multiply the input scrambled SACCH information bit sequence by a scrambling polynomial. At block 2110, the truncater 1210 of the descrambler truncates the product bit sequence resulting from the binary multiplication performed at block 2105 by removing a number of bits (e.g., least significant bits) corresponding to the degree of the scrambling polynomial. At block 2115, the truncater outputs the truncated product bit sequence, which is the descrambled SACCH information bit sequence.

An example process 2200 that may be executed to implement the example SACCH encoding chain 1300 of FIG. 13 is illustrated in FIG. 22. With reference to FIG. 13, the example process 2200 begins execution at block 2205 at which the SACCH encoding chain 1300 obtains an input SACCH information block 600 of SACCH information bits to be transmitted on the SACCH 120. At block 2210, the augmenter 1310 augments the SACCH information bits with an additional set of augmenting bits. At block 1810, the scrambler 1305 scrambles the augmented SACCH information bits obtained at block 2210. An example process to perform scrambling at block 1810 is illustrated in FIG. 20, which is described in greater detail above.

At block 2215, the fire encoder 205 fire-encodes the scrambled, augmented information bits determined at block 1810. At block 2220, the convolutional encoder 1315 encodes and punctures the fire-coded, scrambled and augmented bits determined at block 2215. At block 2225, the interleaver and burst mapper 215 interleaves and maps the convolutionally coded, scrambled and augmented bits to yield four scrambled, augmented plaintext SACCH bursts. At block 2230, the scrambled, augmented plaintext SACCH bursts determined at block 2225 are ciphered by the cipherer(s) 220A-D using A5/1 ciphering. At block 2235, the ciphered SACCH bursts determined at block 2230 are modulated by the modulator(s) 225A-D for transmission on the SACCH 120.

An example process 2300 that may be executed to implement the example SACCH decoding chain 1400 of FIG. 14 is illustrated in FIG. 23. With reference to FIG. 14, the example process 2300 begins execution at block 2305 at which the demodulator(s) 305A-D demodulate four ciphered SACCH bursts received on the SACCH 120. At block 2310, the decipherers 310A-D decipher the demodulated SACCH bursts to obtain four scrambled, augmented plaintext SACCH bursts. At block 2315, the four scrambled, augmented plaintext SACCH bursts are de-interleaved and burst mapped by the de-interleaver and burst mapper 215 to obtain bits for decoding by the convolutional decoder 1405. At block 2320, the convolutional decoder 1405 performs data filling and decoding of the bits determined at block 2315 to obtain the fire-coded, scrambled and augmented bits. At block 2325, the fire decoder 325 performs fire decoding of the bits determined at block 2320 to obtain the scrambled, augmented SACCH information bits.

At block 1930, the descrambler 1410 descrambles the scrambled, augmented SACCH information bits determined at block 1925. An example process to perform descrambling at block 1930 is illustrated in FIG. 21, which is described in greater detail above. At block 2330, the de-augmenter 1415 performs de-augmentation to remove the augmenting bits from the descrambled, augmented bits determined at block 1930. At block 2335, the SACCH decoding chain 1400 obtains from the de-augmenter 1415 the original SACCH information bits forming the SACCH information block 600 that was transmitted on the SACCH 120.

Figure 24:
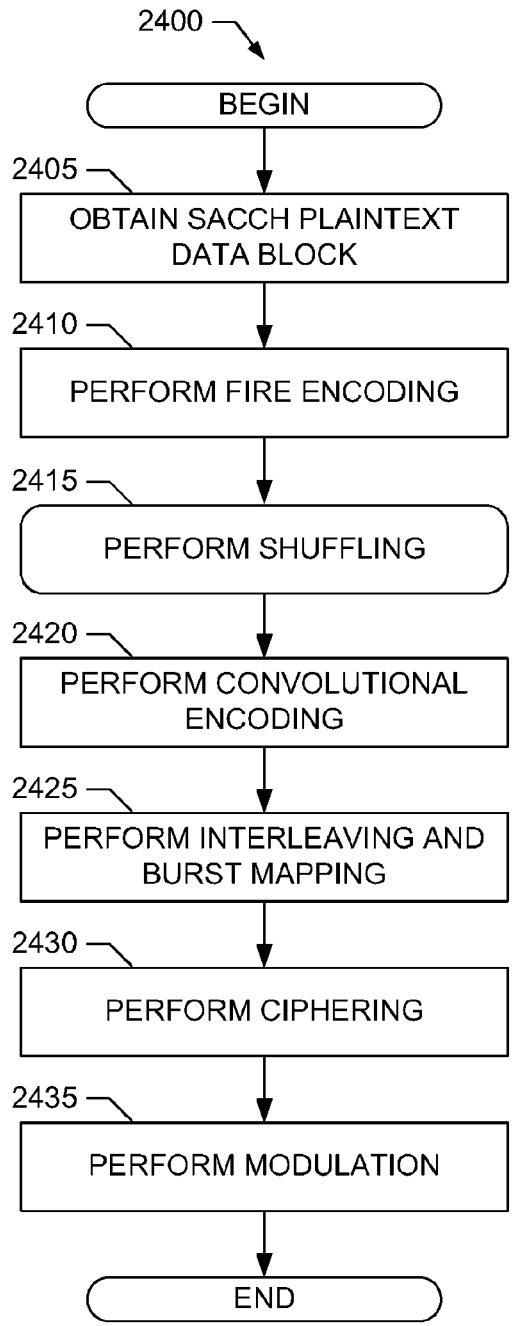
FIG. 24 is a flowchart representative of an example process that may be performed to implement the example SACCH encoding chain of FIG. 15A-B.
Figure 26:
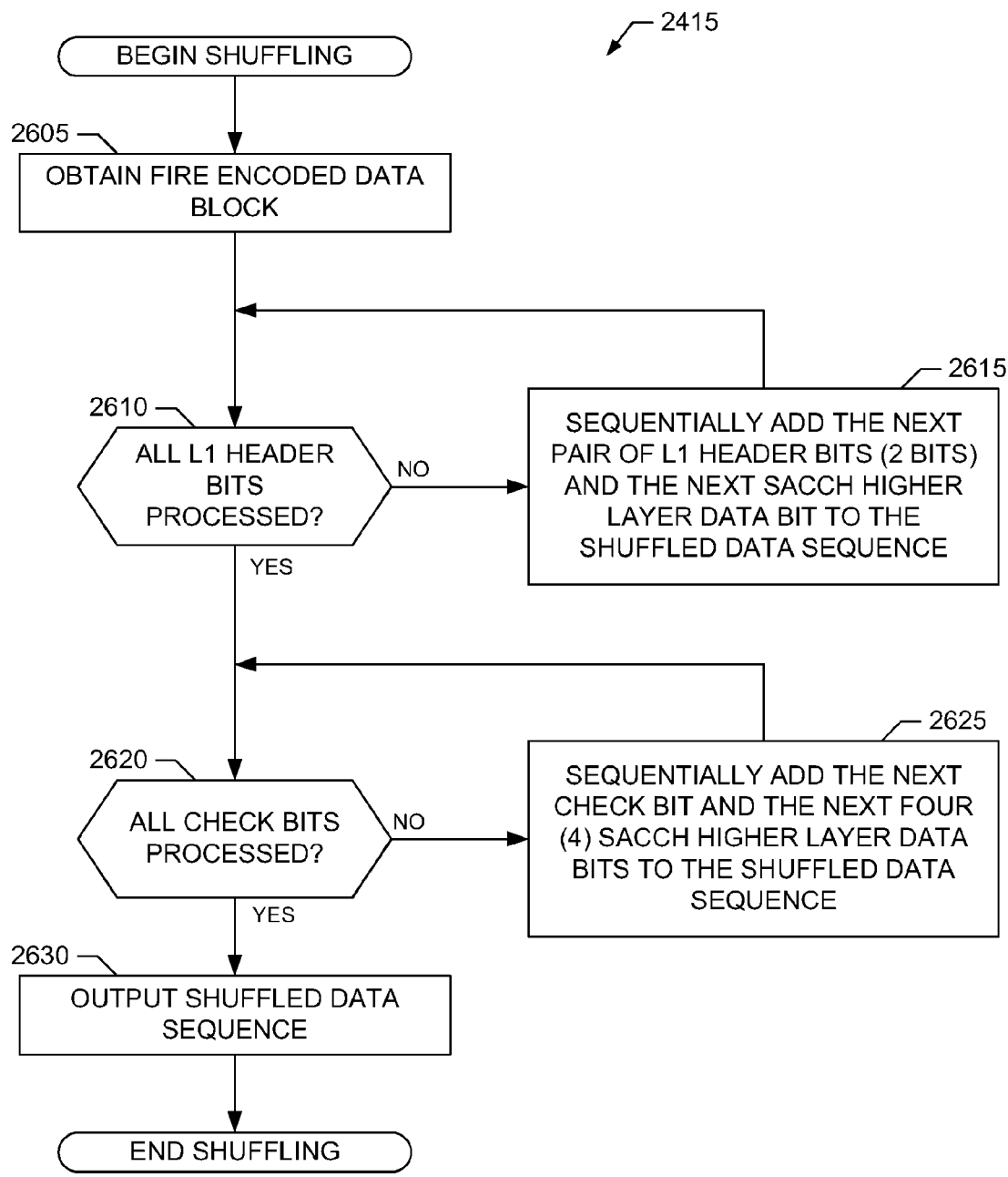
FIG. 26 is a flowchart representative of an example process to perform shuffling that may be used to implement the example process of FIG. 24 and/or performed to implement an example shuffler for use in the example SACCH encoding chain of FIG. 15A-B.

An example process 2400 that may be executed to implement the example SACCH encoding chain 1500 of FIGS. 15A-B is illustrated in FIG. 24. With reference to FIGS. 15A-B, the example process 2400 begins execution at block 2405 at which the SACCH encoding chain 1500 obtains an input SACCH information block 600 of SACCH information bits to be transmitted on the SACCH 120. At block 2410, the fire encoder 205 fire-encodes the SACCH information bits determined at block 2405. At block 2415, the shuffler 1505 shuffles the fire-coded SACCH information bits obtained at block 2410. In some examples, the shuffling process performed by the shuffler 1505 at block 2415 can be a bit mapping operation that, for example, maps the bit positions of the fire-coded information bit sequence 1510 represented by Equation 13 to the corresponding bit positions of the shuffled bit sequence 1520 represented by Equation 14. Additionally or alternatively, an example process to perform shuffling at block 2415 is illustrated in FIG. 26, which is described in greater detail below.

At block 2420, the convolutional encoder 210 encodes the shuffled, fire-coded bits determined at block 2415. At block 2425, the interleaver and burst mapper 215 interleaves and maps the convolutionally coded, shuffled bits to yield four shuffled, plaintext SACCH bursts. At block 2430, the shuffled, plaintext SACCH bursts determined at block 2425 are ciphered by the cipherer(s) 220A-D using A5/1 ciphering. At block 2435, the ciphered SACCH bursts determined at block 2430 are modulated by the modulator(s) 225A-D for transmission on the SACCH 120.

Figure 25:
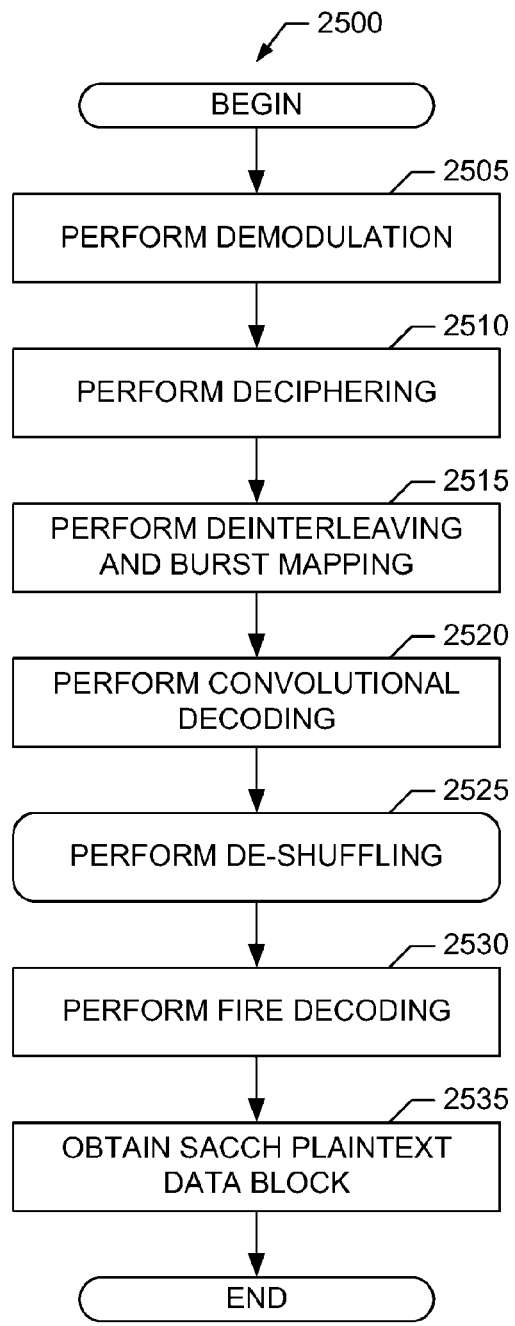
FIG. 25 is a flowchart representative of an example process that may be performed to implement the example SACCH decoding chain of FIG. 16.

An example process 2500 that may be executed to implement the example SACCH decoding chain 1600 of FIG. 16 is illustrated in FIG. 25. With reference to FIG. 16, the example process 2500 begins execution at block 2505 at which the demodulator(s) 305A-D demodulate four ciphered SACCH bursts received on the SACCH 120. At block 2510, the decipherers 310A-D decipher the demodulated SACCH bursts to obtain four shuffled, plaintext SACCH bursts. At block 2515, the four shuffled, plaintext SACCH bursts are de-interleaved and burst mapped by the de-interleaver and burst mapper 215 to obtain the convolutionally coded, shuffled SACCH bits. At block 2520, the convolutionally coded, shuffled SACCH bits are decoded by the convolutional decoder 320 to obtain the fire-coded, shuffled bits.

Figure 27:
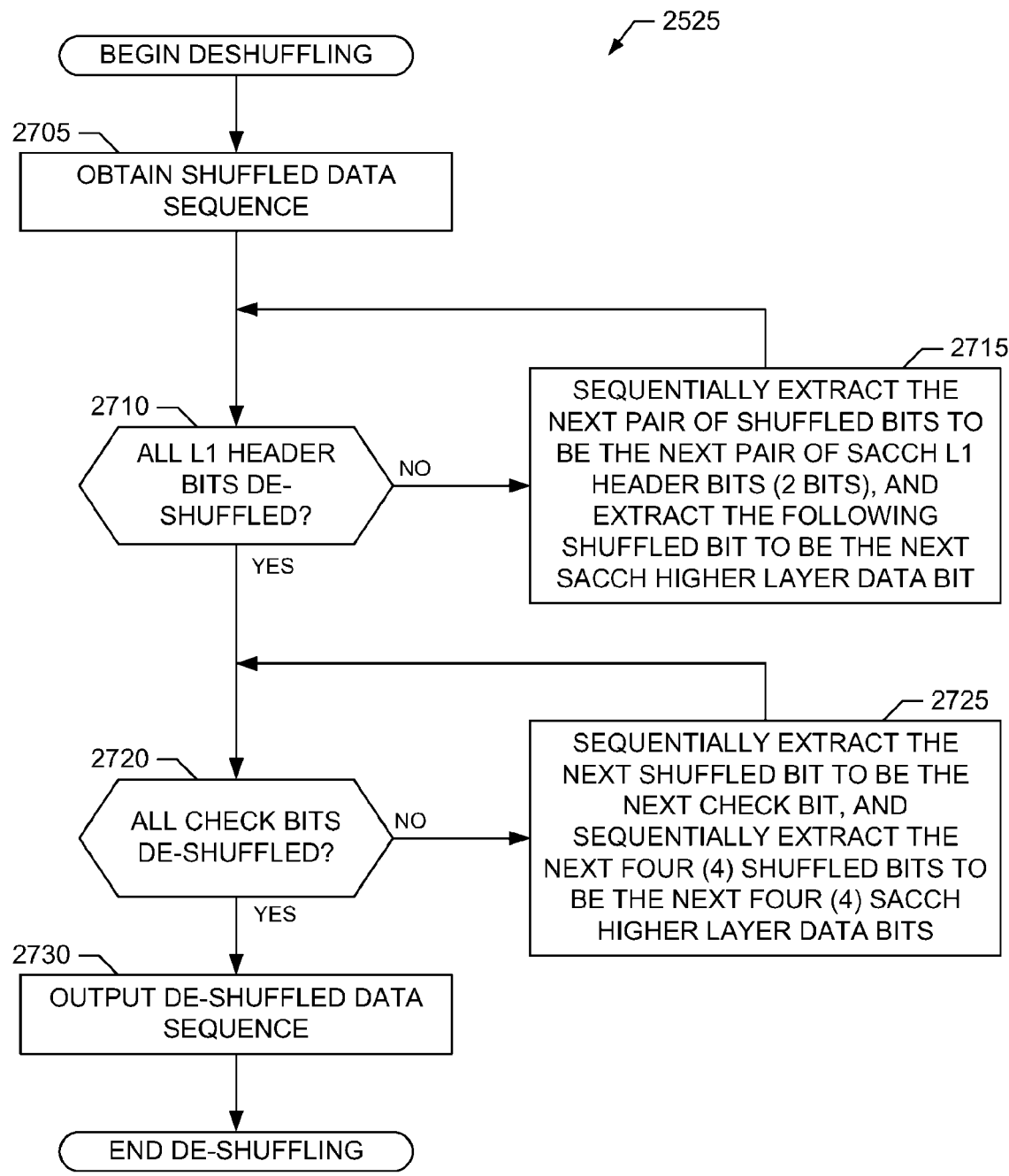
FIG. 27 is a flowchart representative of an example process to perform deshuffling that may be used to implement the example process of FIG. 25 and/or performed to implement an example deshuffler for use in the example SACCH decoding chain of FIG. 16.

At block 2525, the deshuffler 1605 deshuffles the shuffled, fire coded SACCH information bits determined at block 2520. In some examples, the deshuffling process performed by the deshuffler 1605 at block 2525 can be a bit mapping operation that, for example, maps the bit positions of the shuffled bit sequence 1520 represented by Equation 14 to the corresponding bit positions of the fire-coded information bit sequence 1510 represented by Equation 13. Additionally or alternatively, an example process to perform deshuffling at block 2525 is illustrated in FIG. 27, which is described in greater detail below.

At block 2530, the fire decoder 325 performs fire decoding of the fire-coded, deshuffled bits determined at block 2525. At block 2535, the SACCH decoding chain 1600 obtains from the fire decoder 325 the original SACCH information bits forming the SACCH information block 600 that was transmitted on the SACCH 120.

An example shuffling process 2415 that may be used to implement the shuffler 1505 of FIGS. 15A-B, and/or to perform the processing at block 2415 of FIG. 24 is illustrated in FIG. 26. With reference to FIGS. 15A-B, the example process 2415 begins execution at block 2605 at which the shuffler 1505 obtains the fire-coded information bit sequence 1510 to be shuffled. At block 2610, the shuffler 1505 determines whether all layer-1 header bits in the header 605 of the fire-coded information bit sequence 1510 have been shuffled. If there are still layer-1 header bits to be shuffled, then at block 2615 the shuffler 1505 sequentially adds the next pair (or some other number) of layer-1 header bits from the header 605 and the next SACCH higher-layer bit (or some other number of bits) from the higher-layer portion 610 of the fire-coded information bit sequence 1510 to the shuffled bit sequence 1520.

However, if all layer-1 bits have been shuffled, then at block 2620 the shuffler 1505 determines whether all the error detection bits 1515 of the fire-coded information bit sequence 1510 have been shuffled. If there are still error detection bits 1515 to be shuffled, then at block 2625 the shuffler 1505 sequentially adds the next error detection bit 1515 (or some other number of bits) and a next group of SACCH higher-layer bits (such as a next group of four, or some other number of, consecutive bits) from the higher-layer portion 610 of the fire-coded information bit sequence 1510 to the shuffled bit sequence 1520. After all error detection bits 1515 have been shuffled, at block 2630 the shuffler 1505 outputs the resulting shuffled bit sequence 1520.

An example shuffling process 2525 that may be used to implement the deshuffler 1605 of FIG. 16, and/or to perform the processing at block 2525 of FIG. 25 is illustrated in FIG. 27. With reference to FIGS. 16 and 15B, the example process 2525 begins execution at block 2705 at which the deshuffler 1605 obtains the shuffled information bit sequence 1520 to be deshuffled. At block 2710, the deshuffler 1605 determines whether all layer-1 header bits in the shuffled information bit sequence 1520 have been deshuffled. If there are still layer-1 header bits to be deshuffled, then at block 2715 the deshuffler 1605 sequentially extracts the next pair (or some other number) of shuffled bits from the shuffled information bit sequence 1520 for inclusion as the next pair of layer-1 bits in the header 605 of the fire-coded information bit sequence 1510. At block 2715, the deshuffler 1605 also extracts the next shuffled bit (or some other number of bits) from the shuffled information bit sequence 1520 for inclusion as the next SACCH higher-layer bit in the higher-layer portion 610 of the fire-coded information bit sequence 1510.

However, if all layer-1 bits have been deshuffled, then at block 2720 the deshuffler 1605 determines whether all the error detection bits 1515 in the shuffled information bit sequence 1520 have been deshuffled. If there are still error detection bits 1515 to be deshuffled, then at block 2725 the deshuffler 1505 sequentially extracts the next shuffled bit (or some other number of bits) from the shuffled information bit sequence 1520 for inclusion as the next error detection bit 1515 in the fire-coded information bit sequence 1510. At block 2725, the deshuffler 1505 also sequentially extracts a next group of shuffled bits (e.g., such as the next group of four, or some other number of, shuffled bits) from the shuffled information bit sequence 1520 for inclusion as the next group of SACCH higher-layer bits in the higher-layer portion 610 of the fire-coded information bit sequence 1510. After all error detection bits 1515 have been deshuffled, at block 2730 the deshuffler 1605 outputs the resulting deshuffled, fire-coded information bit sequence 1515.

As mentioned above, the scrambling and shuffling techniques to randomize SACCH information bits described herein can be combined. For example, scrambling can be performed before fire coding, and shuffling can be performed after fire coding, as described in the preceding examples. Another example of combining scrambling and shuffling as disclosed herein to randomize SACCH information bits to mitigate plaintext attacks involves modifying the GSM specifications by amending Section 4.1 of the 3rd Generation Partnership Project (3GPP) technical specification (TS) 45.003 to include the following text bounded by the >>>BEGIN<<< and >>>END<<< delimiters:

>>>BEGIN<<<

4.1 Slow Associated Control Channel (SACCH)

4.1.1 Block Constitution

The message delivered to the encoder has a fixed size of 184 information bits $\{d(0), d(1), \ldots, d(183)\}$. It is delivered on a burst mode.

4.1.1 a Randomization

The 184 information bits are randomized through scrambling (modulo-2 division) by the scrambling polynomial gs(D). The degree of scrambling polynomial should be 16 or higher. The polynomial may be primitive.

The output message of the scrambling process generates 184 scrambled bits.

In scrambling, the 184 information bits $\{d(0), d(1), \ldots d(183)\}$ are scrambled by dividing, in GF(2), $d(0)D^{199}+d(1)D^{198}+ \ldots +d(183)D^{16}$ (assuming a gs(D) to be of degree 16) with the scrambling polynomial gs(D).

The generated quotient is the sequence of 184 bits $\{s(0), s(1), \ldots, s(183)\}$.

4.1.2 Block Code a) Parity Bits:

The block of 184 scrambled information bits is protected by 40 extra bits used for error correction and detection. These bits are added to the 184 bits according to a shortened binary cyclic code (FIRE code) using the generator polynomial:

$$g(D)=(D^{23}+1)*(D^{17}+D^3+1)$$

The encoding of the cyclic code is performed in a systematic form, which means that, in GF(2), the polynomial:

$$s(0)D^{223}+s(1)D^{222}+ \ldots +s(183)D^{40}+p(0)D^{39}+p(1)D^{38}+ \ldots +p(38)D+p(39)$$

where $\{p(0), p(1), \ldots, p(39)\}$ are the parity bits, when divided by g(D) yields a remainder equal to:

$$1+D+D^2+ \ldots +D^{39}.$$

a1) Shuffling

The cyclic coded bits $\{s(0), s(1), \ldots, s(183), p(0), p(1), \ldots, p(39)\}$ are shuffled according to the following rule:

for 0 j<24 i(j)=s((j/3)*2) when j mod 3=0;
i(j)=s((j−1)/3*2+1) when j mod 3=1;
i(j)=s((j−2)/3+16) when j mod 3=2;

for 24 j<224 i(j)=p((j−24)/5), when (j−24) mod 5=0;
i(j)=s(j'+(floor((j−24)/5))*4+23), j'=j−24−(floor((j−24)/5))*5, others.

b) Tail Bits

Four tail bits equal to 0 are added to the information and parity bits, the result being a block of 228 bits.

u(k)=i(k) for k=0, 1, . . . , 183
u(k)=p(k−184) for k=184, 185, . . . , 223
u(k)=0 for k=224, 225, 226, 227 (tail bits)

4.1.3 Convolutional Encoder

This block of 228 bits is encoded with the ½ rate convolutional code (identical to the one used for TCH/FS) defined by the polynomials:

$G0=1+D^3+D^4$
$G1=1+D+D^3+D^4$

This results in a block of 456 coded bits: $\{c(0), c(1), \ldots, c(455)\}$ defined by:

c(2k)=u(k)+u(k−3)+u(k−4)
c(2k+1)=u(k)+u(k−1)+u(k−3)+u(k−4), for k=0, 1, . . . , 227; u(k)=0 for k<0

4.1.4 Interleaving

The coded bits are reordered and interleaved according to the following rule:

i(B,j)=c(n,k) for k=0, 1, . . . , 455
n=0, 1, . . . , N, N+1, . . .
B=B$_0$+4n+(k mod 4)
j=2((49k) mod 57)+((k mod 8) div 4)

See table 1. The result of the reordering of bits is the same as given for a TCH/FS (subclause 3.1.3) as can be seen from the evaluation of the bit number-index j, distributing the 456 bits over 4 blocks on even numbered bits and 4 blocks on odd numbered bits. The resulting 4 blocks are built by putting blocks with even numbered bits and blocks with odd numbered bits together into one block The block of coded data is interleaved "block rectangular" where a new data block starts every $4^{th}$ block and is distributed over 4 blocks.

4.1.5 Mapping on a Burst

The mapping is given by the rule:

e(B,j)=i(B,j) and e(B,59+j)=i(B,57+j) for j=0, 1, . . . , 56 and e(B,57)=h1(B) and e(B,58)=hu(B)

The two bits labelled h1(B) and hu(B) on burst number B are flags used for indication of control channel signalling. They are set to "1" for a SACCH.

>>>END<<<

Figure 28:
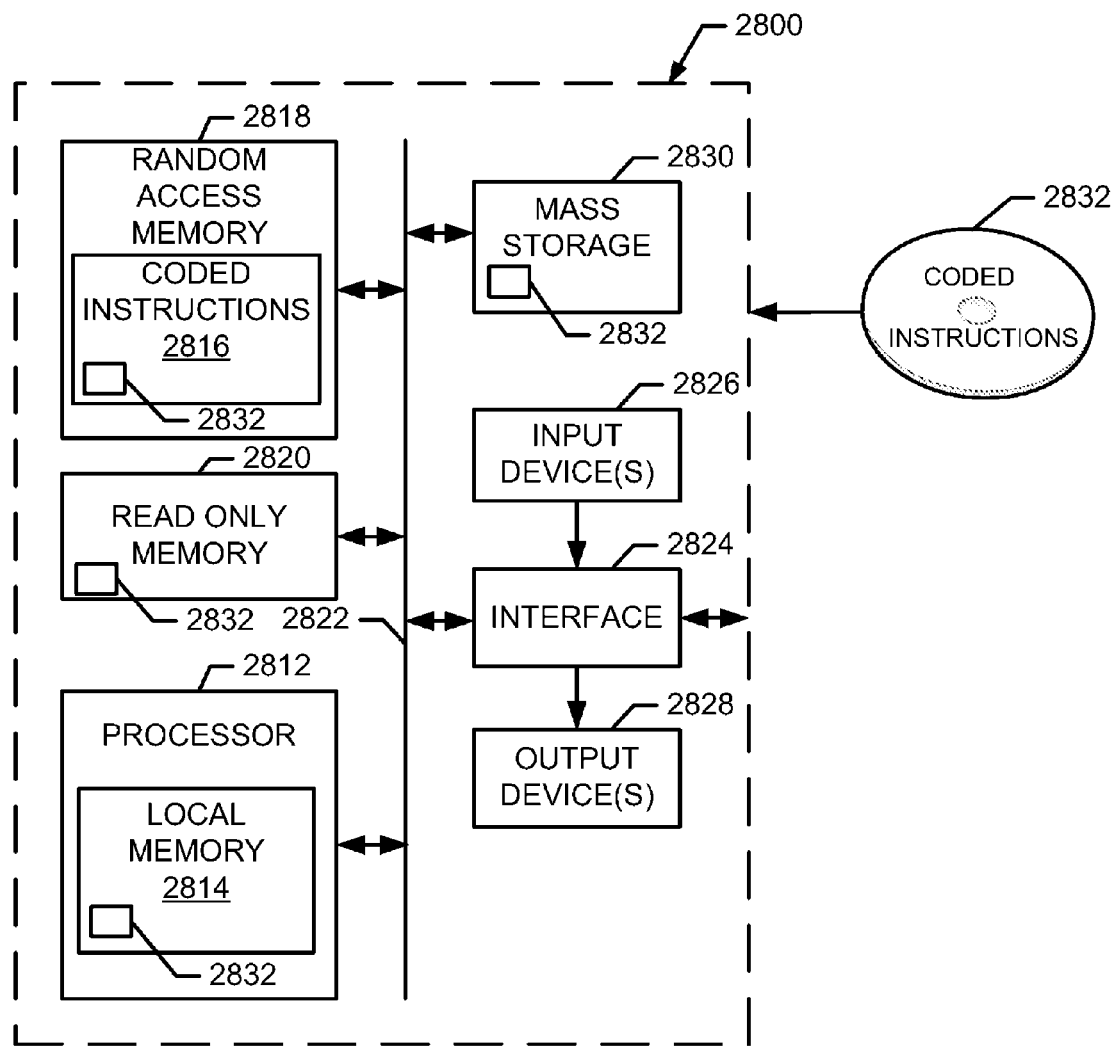
FIG. 28 is a block diagram of an example processing system that may execute example machine readable instructions used to implement some or all of the processes of FIGS. 18-26 and/or 27 to implement the example mobile network of FIG.

FIG. 28 is a block diagram of an example processing system 2800 capable of implementing the apparatus and methods disclosed herein. The processing system 2800 can be, for example, a server, a personal computer, a personal digital assistant (PDA), an Internet appliance, a DVD player, a CD player, a digital video recorder, a personal video recorder, a set top box, or any other type of computing device.

The system 2800 of the instant example includes a processor 2812 such as a general purpose programmable processor. The processor 2812 includes a local memory 2814, and executes coded instructions 2816 present in the local memory 2814 and/or in another memory device. The processor 2812 may execute, among other things, machine readable instructions to implement the processes represented in FIGS. 18-27. The processor 2512 may be any type of processing unit, such as one or more microprocessors from any microprocessor family or families, one or more microcontrollers from any microcontroller family or families, etc., or any combination thereof.

The processor 2812 is in communication with a main memory including a volatile memory 2818 and a non-volatile memory 2820 via a bus 2822. The volatile memory 2818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2820 may be implemented by flash memory and/or any other desired type of memory device. Access to the main memory 2818, 2820 is typically controlled by a memory controller (not shown).

The processing system 2800 also includes an interface circuit 2824. The interface circuit 2824 may be implemented by any type of interface standard, such as an Ethernet interface, a universal serial bus (USB), and/or a third generation input/output (3GIO) interface.

One or more input devices 2826 are connected to the interface circuit 2824. The input device(s) 2826 permit a user to enter data and commands into the processor 2812. The input device(s) can be implemented by, for example, a keyboard, a mouse, a touchscreen, a track-pad, a trackball, an isopoint and/or a voice recognition system.

One or more output devices 2828 are also connected to the interface circuit 2824. The output devices 2828 can be implemented, for example, by display devices (e.g., a liquid crystal display, a cathode ray tube display (CRT)), by a printer and/or by speakers. The interface circuit 2824, thus, typically includes a graphics driver card.

The interface circuit 2824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 2800 also includes one or more mass storage devices 2830 for storing machine readable instructions and data. Examples of such mass storage devices 2830 include floppy disk drives, hard drive disks, compact disk drives and digital versatile disk (DVD) drives.

The coded instructions 2832 of FIGS. 18-27 may be stored in the mass storage device 2830, in the volatile memory 2818, in the non-volatile memory 2820, in the local memory 2814 and/or on a removable storage medium, such as a CD or DVD 2832.

As an alternative to implementing the methods and/or apparatus described herein in a system such as the processing system of FIG. 28, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
prior to applying encoding that is to generate a set of error detection bits for information to be communicated over a slow associated control channel, randomizing, by a processor, a first set of bits associated with the information to be communicated over the slow associated control channel by applying a scrambling factor to generate a set of scrambled bits equal in length to the first set of bits, wherein the scrambling factor comprises a scrambling polynomial, and the scrambling factor is applied by performing binary sequence division to divide the first set of bits by the scrambling polynomial; and
applying, by the processor, the encoding to the set of scrambled bits to generate the set of error detection bits.

2. A method as defined in claim 1 wherein a degree of the scrambling polynomial is at least sixteen.

3. A method as defined in claim 1 wherein the scrambling factor is a primitive.

4. A method as defined in claim 1 wherein the scrambling factor is fixed.

5. A method as defined in claim 1 wherein the first set of bits includes a set of information bits concatenated with a set of augmenting bits.

6. A method as defined in claim 5 further comprising performing encoding with puncturing after randomizing the first set of bits.

7. A method as defined in claim 1 wherein the set of scrambled bits comprises a first subset of scrambled bits and a second subset of scrambled bits.

8. A method as defined in claim 7 wherein the first subset of scrambled bits corresponds to a layer-1 header and the second subset of scrambled bits corresponds to higher layer information.

9. A method as defined in claim 7 further comprising concatenating the set of error detection bits with the set of scrambled bits to generate a set of coded bits.

10. A method comprising
randomizing, by a processor, a first set of bits associated with information to be communicated over a slow associated control channel by applying a scrambling factor to generate a set of scrambled bits equal in length to the first set of bits, wherein the scrambling factor is determined based on a frame number and a ciphering key.

11. A method comprising:
randomizing, by a processor, a first set of bits associated with information to be communicated over a slow associated control channel by applying a scrambling factor to generate a set of scrambled bits equal in length to the first set of bits, wherein the set of scrambled bits comprises a first subset of scrambled bits and a second subset of scrambled bits;
concatenating, by the processor, a set of error detection bits with the set of scrambled bits to generate a set of coded bits; and
shuffling, by the processor, the set of coded bits to generate a set of shuffled bits, wherein a length of each group of consecutive bits from the second subset of scrambled bits in the generated set of shuffled bits is less than a predetermined number.

12. A method as defined in claim 11 wherein the predetermined number is five.

13. A method as defined in claim 11 wherein the set of coded bits is a first set of coded bits, and further comprising performing forward error correction coding on the set of shuffled bits to generate a second set of coded bits.

14. A method as defined in claim 13 wherein performing forward error correction coding comprises performing convolutional coding.

15. A method comprising;
randomizing, by a processor, a first set of bits associated with information to be communicated over a slow associated control channel by applying a scrambling factor to generate a set of scrambled bits equal in length to the first set of bits, wherein the set of scrambled bits comprises a first subset of scrambled bits and a second subset of scrambled bits;
concatenating, by the processor, a set of error detection bits with the set of scrambled bits to generate a set of coded bits; and shuffling, by the processor, the set of coded bits to generate a set of shuffled bits, wherein shuffling the set of coded bits comprises:
generating a first subset of shuffled bits and a second subset of shuffled bits, wherein
the first subset of shuffled bits comprises groups of three bits that include two bits from the first subset of scrambled bits and one bit from the second subset of scrambled bits, and
the second subset of shuffled bits comprises groups of five bits that include four bits from the second subset of scrambled bits and one bit from the set of error detection bits.

16. A tangible machine readable medium comprising machine readable instructions which, when executed, cause a machine to at least:
prior to application of encoding that is to generate error detection bits for information to be communicated over a slow associated control channel, randomize a first set of bits associated with the information to be communicated over the slow associated control channel by applying a scrambling factor to generate a set of scrambled bits equal in length to the first set of bits, wherein the scrambling factor comprises a scrambling polynomial, and the scrambling factor is applied by performing binary sequence division to divide the first set of bits by the scrambling polynomial; and
apply the encoding to the set of scrambled bits to generate the error detection bits.

17. A method comprising:
concatenating, by a processor, a set of error detection bits with a set of information bits associated with information to be transmitted over a slow associated control channel to generate a set of coded bits; and
shuffling, by the processor, the set of coded bits to generate a set of shuffled bits, wherein the set of information bits comprises a first subset of information bits and a second subset of information bits, and wherein a length of each group of consecutive bits from the second subset of information bits in the generated set of shuffled bits is less than a predetermined number.

18. A method as defined in claim 17 wherein the predetermined number is five.

19. A method as defined in claim 17 wherein the set of coded bits is a first set of coded bits, and further comprising performing forward error correction coding on the set of shuffled bits to generate a second set of coded bits.

20. A method as defined in claim 19 wherein performing forward error correction coding comprises performing convolutional coding.

21. A method comprising:
concatenating, by a processor, a set of error detection bits with a set of information bits associated with information to be transmitted over a slow associated control channel to generate a set of coded bits; and
shuffling, by the processor, the set of coded bits to generate a set of shuffled bits, wherein the set of information bits comprises a first subset of information bits and a second subset of information bits, and wherein shuffling the set of coded bits comprises:
generating a first subset of shuffled bits and a second subset of shuffled, wherein
the first subset of shuffled bits comprises groups of three bits that include two bits from the first subset of information bits and one bit from the second subset of information bits, and
the second subset of shuffled bits comprises groups of five bits that include four bits from the second subset of information bits and one bit from the set of error detection bits.

22. A tangible machine readable medium storing machine readable instructions which, when executed, cause a machine to at:
concatenate a set of error detection bits with a set of information bits associated with information to be transmitted over a slow associated control channel to generate a set of coded bits; and
shuffle the set of coded bits to generate a set of shuffled bits, wherein the set of information bits comprises a first subset of information bits and a second subset of information bits, and wherein a length of each group of consecutive bits from the second subset of information bits in the generated set of shuffled bits is less than a predetermined number.

* * * * *